United States Patent
Shet et al.

(10) Patent No.: US 12,413,584 B2
(45) Date of Patent: Sep. 9, 2025

(54) METHOD AND SYSTEM FOR SELF-ONBOARDING OF IOT DEVICES

(71) Applicant: SAMSUNG ELECTRONICS CO., LTD., Suwon-si (KR)

(72) Inventors: Ravindra Balkrishna Shet, Bengaluru (IN); Ravi Kanth Reddy, Bengaluru (IN); Nabeel Mohamed Chemnad Lasyath, Kasaragod (IN); Vijayachandra Pabbineedi, Bangalore (IN); Harit Sharma, Bareilly (IN); Raghavendra Vaddarahalli Ramegowda, Mysore (IN); Nishant Bhaskar Deshpande, Bangalore (IN); Dixit Kumar, Bengaluru (IN); Hariprasad Taduru, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 275 days.

(21) Appl. No.: 17/947,848

(22) Filed: Sep. 19, 2022

(65) Prior Publication Data

US 2023/0107045 A1    Apr. 6, 2023

Related U.S. Application Data

(63) Continuation of application No. PCT/KR2022/013609, filed on Sep. 13, 2022.

(30) Foreign Application Priority Data

Oct. 1, 2021 (IN) .............................. 202141044734

(51) Int. Cl.
H04L 9/40    (2022.01)

(52) U.S. Cl.
CPC ...... *H04L 63/0876* (2013.01); *H04L 63/0236* (2013.01); *H04L 63/20* (2013.01)

(58) Field of Classification Search
CPC .. H04L 63/0876; H04L 63/0236; H04L 63/20
See application file for complete search history.

(56) References Cited

U.S. PATENT DOCUMENTS 9,465,951 B1    10/2016    Cudmore et al.
10,292,027 B2    5/2019    Goluboff
(Continued)

FOREIGN PATENT DOCUMENTS

KR    10-1844012 B1    3/2018

OTHER PUBLICATIONS

International Search Report and Written Opinion (PCT/ISA/210, PCT/ISA/237) issued Jan. 13, 2023 by the International Searching Authority in International Application No. PCT/KR2022/013609.
(Continued)

*Primary Examiner* — Oleg Korsak
(74) *Attorney, Agent, or Firm* — Sughrue Mion, PLLC

(57) ABSTRACT

Provided is a self-onboarding method for an IoT device. The method includes: identifying, by the IoT device, a trusted device and at least one wireless network in a vicinity of the IoT device; based on identifying the trusted device in the vicinity of the IoT device, establishing, by the IoT device, a connection with an onboarding server through the trusted device; based on identifying the at least one wireless network in the vicinity of the IoT device, sending, by the IoT device, a list of the at least one wireless network to the onboarding server using the connection; receiving, by the IoT device, self-provisioning information from the onboarding server; and onboarding, by the IoT device, through the at least one wireless network based on the self-provisioning information.

16 Claims, 16 Drawing Sheets

(56) References Cited

U.S. PATENT DOCUMENTS

| | | | |
|---|---|---|---|
| 10,547,613 B1 | 1/2020 | Roths et al. | |
| 11,087,890 B2 | 8/2021 | Turrin et al. | |
| 11,399,285 B2* | 7/2022 | Smith | H04W 12/35 |
| 2017/0208070 A1 | 7/2017 | Burns et al. | |
| 2018/0199204 A1 | 7/2018 | Roche et al. | |
| 2019/0058586 A1 | 2/2019 | Kumar et al. | |
| 2019/0250899 A1* | 8/2019 | Riedl | H04L 9/0825 |
| 2019/0332774 A1 | 10/2019 | Nix | |
| 2020/0004523 A1* | 1/2020 | Eroshkina | H04L 12/66 |
| 2020/0076896 A1 | 3/2020 | Anumala et al. | |
| 2020/0275273 A1* | 8/2020 | Smith | H04W 12/50 |
| 2021/0051147 A1 | 2/2021 | Hardy et al. | |
| 2021/0058784 A1* | 2/2021 | Kedalagudde | H04W 48/18 |

OTHER PUBLICATIONS

Symington et al., "Trusted Internet of Things (IoT) Device Network-Layer Onboarding and Lifecycle Management", Sep. 8, 2020, In: NIST Cybersecurity White Paper (Draft), 90 pages total.

Ogrodowczyk et al., "IoT ecosystem over programmable SDN infrastructure for Smart City applications", Oct. 10, 2016, Fifth European Workshop on Software-Defined Networks, 5 pages total.

Ericsson et al., "UE onboarding", May 10, 2021, S2-2104217, 3GPP TSG-WG SA2 Meeting #145E e-meeting, S2-2104217, 16 pages total.

Communication issued Aug. 12, 2024 by the European Patent Office in European Application No. 22876710.9.

* cited by examiner

METHOD AND SYSTEM FOR SELF-ONBOARDING OF IOT DEVICES

CROSS-REFERENCE TO RELATED APPLICATIONS

This application is a bypass application of PCT International Application No. PCT/KR2022/013609, which was filed on Sep. 13, 2022, and claims priority to Indian Patent Application No. 202141044734, filed on Oct. 1, 2021, in the Indian Patent Office, the disclosure of which is incorporated herein by reference in its entirety.

BACKGROUND

1. Field

The disclosure relates to an electronic device, and more specifically to a method and a system for self-onboarding of Internet of Things (IoT) devices.

2. Description of Related Art

IoT devices are widely used in environments such as home, office, etc. and can be controlled remotely/indirectly through a network (e.g., internet) using a control application installed on another device on the same network. Capability of the IoT devices to access internet is one of the unique features that differentiates the IoT devices from conventional electrical appliances. However, the IoT devices are not capable to auto onboard for accessing the internet from a wireless network (e.g., Wi-Fi access point). Onboarding is the process of connecting a new device, first to the internet, then subsequently to its enabling services. Generally, a user needs to manually onboard the IoT devices to connect and control to the wireless network. To begin onboarding of the IoT devices, the user must be present with a master device (e.g., smartphone) in proximity to the IoT devices. Further, the user needs to launch an IoT device controlling application to discover the IoT devices. Further, the user needs to select a location (e.g., home, office, etc.) where the IoT devices are located. Further, the user needs to link the IoT devices with a user account. Further, the user needs to find the wireless network to which IoT devices have to connect. Upon finding the wireless network, the user needs to link the IoT devices with the wireless network by manually entering a password to the wireless network on behalf of the IoT devices. Performing manual onboarding of the IoT devices in this way requires upwards of 8 user interactions (e.g., clicks) and 12 updates to a User Interface (UI) of the IoT device controlling application needs, and still there is more than a 50% chance that the manual onboarding fails. The onboarding failure(s) may discourage the user from adopting the IoT devices.

Furthermore, when a password of the wireless network is updated, the user is expected to re-configure the IoT devices by manually entering the updated password on behalf of the IoT devices. Also, when the IoT devices are moved around within a location or multiple locations, the user is expected to re-configure the IoT devices with a new wireless network available at that location. Thus, it is desired to provide a useful solution for self-onboarding the IoT devices without any manual intervention.

SUMMARY

Provided are method and a system for self-onboarding of an IoT device. The self-onboarding aims for the IoT device to reduce human effort in configuring the IoT device. The secure self-onboarding method for the IoT device runs in background and does not need any manual presence/intervention for configuring the IoT device on a wireless network. During an onboarding setup, the user and a master device need not be in a vicinity of the IoT device to be onboarded. In case of any failure in the onboarding, the IoT device retries itself without any manual intervention. Thus, the method reduces a failure rate of the onboarding and provides frustration free onboarding of the IoT device to the user with zero UI updates, and zero user clicks. Also, a device state of the IoT device may progress from plugged-in to ready-to-use (onboarded) in less than a minute, which improves user experience.

Further, provided is a method to access the onboarding server via a secure network provided by helper nodes. Wireless access provided by a helper device (node) is highly secure as compared to any open network. The helper nodes belong to a manufacturer or an IoT service provider. Also, the method uses an asymmetric key system (i.e. public-private key system) for encryption and decryption of the security credential of the wireless network. Hence, the method provides high-end security to the security credential and the IoT device.

According to an aspect of the disclosure, a self-onboarding method for an Internet of Things (IoT) device, includes: identifying, by the IoT device, a trusted device and at least one wireless network in a vicinity of the IoT device; based on identifying the trusted device in the vicinity of the IoT device, establishing, by the IoT device, a connection with an onboarding server through the trusted device; based on identifying the at least one wireless network in the vicinity of the IoT device, sending, by the IoT device, a list of the at least one wireless network to the onboarding server using the connection; receiving, by the IoT device, self-provisioning information from the onboarding server; and onboarding, by the IoT device, through the at least one wireless network based on the self-provisioning information.

The establishing, by the IoT device, the connection with the onboarding server through the trusted device may include: sending, by the IoT device, an advertisement including an identifier of the IoT device to the trusted device; receiving, by the IoT device, onboarding metadata including onboarding server information and authentication information from the trusted device; and establishing, by the IoT device, the connection with the onboarding server through the trusted device based on the onboarding metadata.

The establishing, by the IoT device, the connection with the onboarding server through the trusted device may include: identifying, by the IoT device, the onboarding server based on the onboarding server information; establishing, by the IoT device, the connection with the onboarding server through the trusted device based on the onboarding metadata; sending, by the IoT device, the onboarding metadata to the onboarding server; and receiving, by the IoT device, a permission to continue the connection with the onboarding server through the trusted device upon successfully authenticating the IoT device by the onboarding server based on the authentication information in the onboarding metadata.

The self-provisioning information may include a location of the IoT device, a location of the at least one wireless network, and an encrypted security credential of the at least one wireless network.

The onboarding, by the IoT device, through the at least one wireless network may include: disabling, by the IoT device, the connection with the onboarding server; determining, by the IoT device, a nearest wireless network from the at least one wireless network based on a location of the IoT device, and a location of the at least one wireless network in the self-provisioning information; determining, by the IoT device, a security credential of the nearest wireless network by decrypting the encrypted security credential in the self-provisioning information; and onboarding, by the IoT device, through the nearest wireless network by logging in to the nearest wireless network using the security credential.

According to an aspect of the disclosure, a self-onboarding method for an Internet of Things (IoT) device, includes: receiving, by an onboarding server, a request for connection including onboarding metadata from the IoT device through a trusted device; determining, by the onboarding server, that the IoT device is authorized based on the onboarding metadata; based on determining that the IoT device is authorized, establishing, by the onboarding server, a connection with the IoT device through the trusted device; and providing, by the onboarding server, self-provisioning information to the IoT device via the connection.

The providing, by the onboarding server, the self-provisioning information to the IoT device, may include: receiving, by the onboarding server, a list of at least one wireless network in a vicinity of the IoT device from the IoT device using the connection; determining, by the onboarding server, a location of the IoT device based on the list of at least one wireless network; determining, by the onboarding server, an encrypted security credential and a location of at least one wireless network included in the list of the at least one wireless network, using a database; and sending, by the onboarding server, the self-provisioning information to the IoT device, the self-provisioning information including the location of the IoT device, the location of the at least one wireless network, and the encrypted security credential of the at least one wireless network to the IoT device.

The list of at least one wireless network in the vicinity of the IoT device may include at least one of an identifier and an access point name for each wireless network included in the list.

The self-onboarding method may further include: receiving, by the onboarding server, onboarded information from one or more onboarded devices through at least one wireless network in a vicinity of the one or more onboarded devices, wherein the onboarded information from each onboarded device may include an identifier of at least one wireless network in a vicinity of the onboarded device, a security credential of the at least one wireless network in the vicinity of the onboarded device, and a location of the at least one wireless network in the vicinity of the onboarded device; encrypting, by the onboarding server, the security credential of the at least one wireless network; and generating, by the onboarding server, the database based on the identifier of the at least one wireless network, the location of the at least one wireless network, and the encrypted security credential.

According to an aspect of the disclosure, an Internet of Things (IoT) device includes: a memory configured to store instructions; and a processor configured to execute the instructions to implement a self-onboarding engine; wherein the self-onboarding engine is configured to: identify a trusted device and at least one wireless network in vicinity of the IoT device; based on identifying the trusted device in the vicinity of the IoT device, establish a connection with an onboarding server through the trusted device; based on identifying the at least one wireless network in the vicinity of the IoT device, send a list of the at least one wireless network to the onboarding server using the connection; receive self-provisioning information from the onboarding server; and perform onboarding through the at least one wireless network based on the self-provisioning information.

The self-onboarding engine may be further configured to establish the connection with the onboarding server by: sending an advertisement including an identifier of the IoT device to the trusted device; receiving onboarding metadata including onboarding server information and authentication information from the trusted device; and establishing the connection with the onboarding server through the trusted device based on the onboarding metadata.

The self-onboarding engine may be further configured to establish the connection by: identifying the onboarding server based on the onboarding server information; establishing the connection with the onboarding server through the trusted device based on the onboarding metadata; sending the onboarding metadata to the onboarding server; and receiving a permission to continue the connection with the onboarding server through the trusted device upon successfully authenticating the IoT device by the onboarding server based on the authentication information in the onboarding metadata.

The self-provisioning information may include a location of the IoT device, a location of the at least one wireless network, and an encrypted security credential of the at least one wireless network.

The self-onboarding engine may be further configured to perform the onboarding through the at least one wireless network by: disabling the connection with the onboarding server; determining a nearest wireless network from the at least one wireless network based on a location of the IoT device, and a location of the at least one wireless network in the self-provisioning information; determining a security credential of the nearest wireless network by decrypting the encrypted security credential in the self-provisioning information; and onboarding through the nearest wireless network by logging in to the nearest wireless network using the security credential.

According to an aspect of the disclosure, a onboarding server for self-onboarding an Internet of Things (IoT) device, includes: a memory configured to store instructions; and a processor configured to execute the instructions to implement a self-onboarding engine; wherein the self-onboarding engine is configured to: receive a request for connection including onboarding metadata from the IoT device through a trusted device; determine that the IoT device is authorized based on the onboarding metadata; based on determining that the IoT device is authorized, establish a connection with the IoT device through the trusted device; and provide self-provisioning information to the IoT device via the connection.

The self-onboarding engine may be further configured to provide the self-provisioning information to the IoT device by: receiving a list of the at least one wireless network in the vicinity of the IoT device from the IoT device using the connection; determining a location of the IoT device based on the list of the at least one wireless network; determining an encrypted security credential and a location of at least one wireless network included in the list of the at least one wireless network, using a database; and sending the self-provisioning information to the IoT device, the self-provisioning information including the location of the IoT device, the location of the at least one wireless network, and the encrypted security credential of the at least one wireless network.

The list of the at least one wireless network in the vicinity of the IoT device may include at least one of an identifier and an access point name for each wireless network included in the list.

The self-onboarding engine may be further configured to: receive onboarded information from one or more onboarded devices through at least one wireless network in a vicinity of the one or more onboarded devices, wherein the onboarded information from each onboarded device includes an identifier of at least one wireless network in a vicinity of the onboarded device, a security credential of the at least one wireless network in the vicinity of the onboarded device, and a location of the at least one wireless network in the vicinity of the onboarded device; encrypt the security credential of the at least one wireless network; and generate the database based on the identifier of the at least one wireless network, the location of the at least one wireless network, and the encrypted security credential.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments, and the embodiments herein include all such modifications.

BRIEF DESCRIPTION OF THE DRAWINGS

The above and other aspects, features and advantages of certain embodiments of the present disclosure will be more apparent from the following description taken in conjunction with the accompanying drawings, in which.

DETAILED DESCRIPTION

Figure 1:
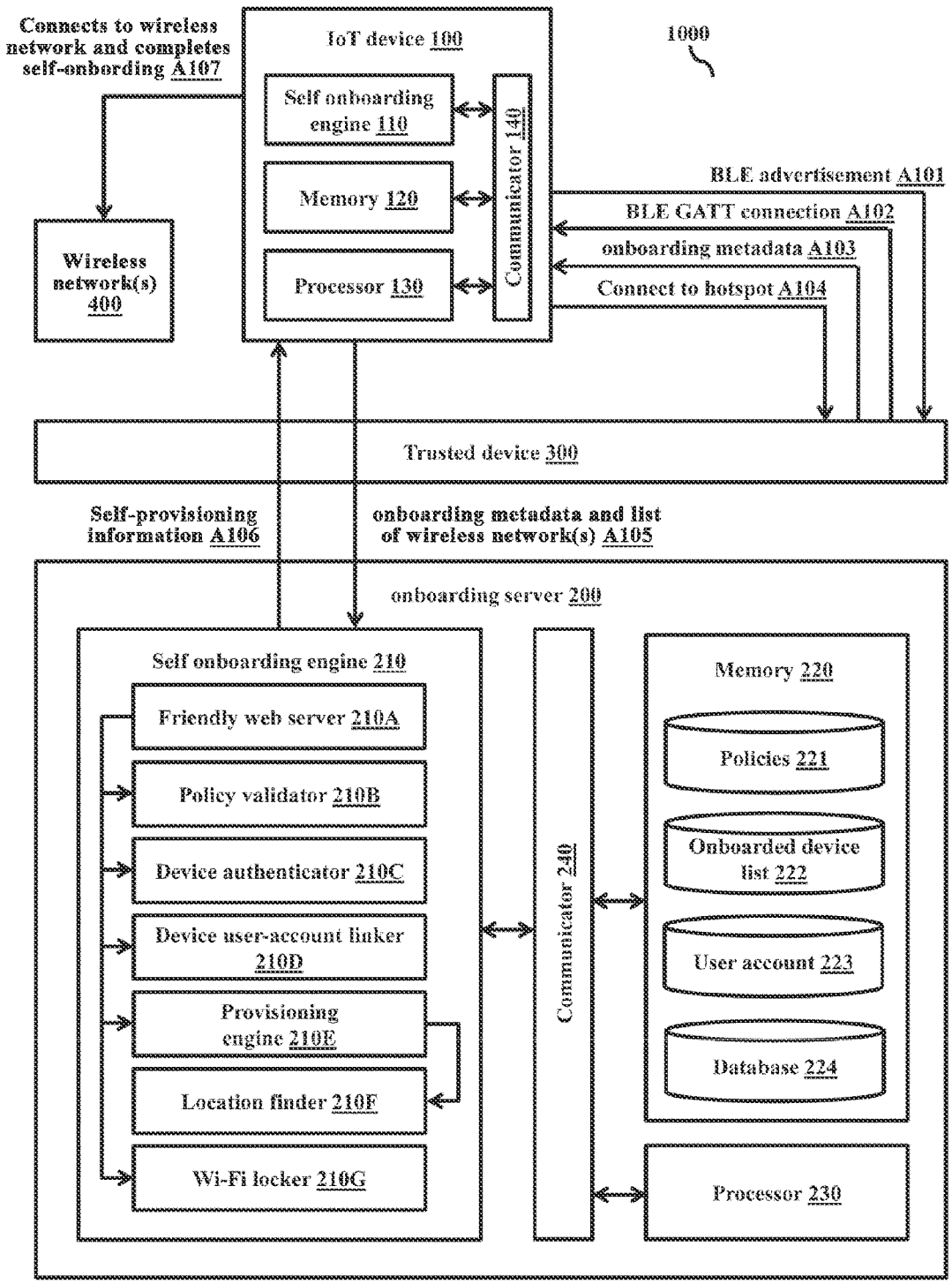
FIG. 1 is a block diagram of a system for self-onboarding of an IoT device, according to an embodiment.

The embodiments herein and the various features and advantageous details thereof are explained more fully with reference to the non-limiting embodiments that are illustrated in the accompanying drawings and detailed in the following description, where similar reference characters denote corresponding features consistently throughout. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Throughout this disclosure, the terms "trusted device" and "helper device" "helper node" are used interchangeably and mean the same.

Accordingly, various embodiments of the present disclosure provide a self-onboarding method for an Internet of Things (IoT) device. The method includes scanning, by the IoT device, for identifying a trusted device and wireless networks in a vicinity of the IoT device. The method includes establishing, by the IoT device, a connection with an onboarding server through the trusted device in response to identifying the trusted device in the vicinity of the IoT device. The method includes sending, by the IoT device, a list of the wireless networks to the onboarding server using the connection, in response to identifying the wireless networks in the vicinity of the IoT device. The method includes receiving, by the IoT device, self-provisioning information from the onboarding server. The method includes automatically onboarding, by the IoT device, through the wireless networks based on the self-provisioning information.

Accordingly, various embodiments of the present disclosure provide the self-onboarding method for the IoT device. The method includes receiving, by the onboarding server, a request for the connection including the onboarding metadata from the IoT device through the trusted device. The method includes determining, by the onboarding server, that the IoT device is authorized based on the onboarding metadata. The method includes establishing, by the onboarding server, the connection with the IoT device through the trusted device for providing the self-provisioning information to the IoT device.

Accordingly, various embodiments of the present disclosure provide the IoT device for self-onboarding. The IoT device includes a self-onboarding engine, a memory, and a processor, where the self-onboarding engine is coupled to the memory and the processor. The self-onboarding engine is configured for scanning and identifying the trusted device and the wireless network(s) in a vicinity of the IoT device. The self-onboarding engine is configured for establishing the connection with the onboarding server through the trusted device in response to identifying the trusted device in the vicinity of the IoT device. The self-onboarding engine is configured for sending the list of the wireless network(s) to the onboarding server using the connection, in response to identifying the wireless network(s) in the vicinity of the IoT device. The self-onboarding engine is configured for receiving the self-provisioning information from the onboarding server. The self-onboarding engine is configured for automatically onboarding through the wireless network(s) based on the self-provisioning information.

Accordingly, various embodiments of the present disclosure provide the onboarding server for self-onboarding. The onboarding server includes a self-onboarding engine, a memory, a processor, where the self-onboarding engine is coupled to the memory and the processor. The self-onboarding engine is configured for receiving the request for connection including the onboarding metadata from the IoT device through the trusted device. The self-onboarding engine is configured for determining that the IoT device is authorized based on the onboarding metadata. The self-onboarding engine is configured for establishing the connection with the IoT device through the trusted device for providing the self-provisioning information to the IoT device.

All onboarded devices synchronize security credentials of the wireless network to which the onboarded devices are connected with the onboarding server. Further, the onboarding server encrypts the security credentials using a public key and stores them in a database. At a time of purchase of a brand new IoT device, a manufacturer or a seller of the IoT device links the IoT device with a user account provided by the manufacturer/seller to the user. Also, the manufacturer/seller embeds a device ID and a private key with the IoT device. When the IoT device is plugged in by the user, then the IoT device starts Bluetooth low energy (BLE) advertisements and finds a nearby helper device. The helper device shares temporary network access and onboarding metadata with the IoT device. Further, the IoT device scans for available wireless network(s) and sends the list of the scanned wireless network(s) to the onboarding server along with an initial authentication token. Further, the onboarding server configures the self-provisioning information and determines the IoT device location based on the list of the scanned wireless network(s). Further, the IoT device receives the self-provisioning information and the encrypted security credential of each scanned wireless network from the onboarding server. Further, the IoT device decrypts the encrypted security credential using the private key. Further, the IoT device connects to one of the wireless network using the security credential and starts self-onboarding.

According to an aspect of the present disclosure, the secure self-onboarding method for the IoT device runs in background and does not need any manual presence or intervention for configuring the IoT device on the wireless network. During onboarding set up, the user and a master device need not be in a vicinity of the IoT device to be onboarded. In case of any failure in the onboarding, the IoT device retries itself without any manual intervention. Thus, the proposed method reduces a failure rate in the onboarding and provides frustration free onboarding of the IoT device to the user with zero UI updates, and zero user clicks. Also, a device state of the IoT device from plugged-in to ready-to-use (onboarded) happens in less than a minute, which improves user experience.

According to an aspect of the present disclosure, the IoT device accesses the onboarding server via a secure network provided by the helper node. Wireless access provided by the helper node is highly secure as compared to any open network. The helper node belongs to the manufacturer or an IoT service provider. Also, the proposed method uses an asymmetric key system (i.e. public-private key system) for secure transfer of the security credential of the wireless network between. Hence, the proposed method provides high end security to the security credential and the IoT device.

Referring now to the drawings, and more particularly to FIGS. 1 through 16, there are shown preferred embodiments.

FIG. 1 is a block diagram of a system 1000 for self-onboarding of an IoT device 100, according to an embodiment. In an embodiment, the system 1000 includes the IoT device 100, an onboarding server 200, a trusted device 300, and one or more wireless network(s) 400. Examples of the wireless network(s) 400 include, but are not limited to wireless fidelity access points (Wi-Fi APs) located at different/same rooms in a location (e.g., home, office). The trusted device 300 is an onboarded device such as a smartphone, an Internet of Things (IoT) device, a laptop, a wearable device, etc. which is already a part of service provider's IoT network. In an embodiment, the trusted device is connected to the internet via the wireless network(s) 400.

Examples of the IoT device 100 include, but are not limited to, a smart television (smart TV), a smart refrigerator, a smart plug etc. In an embodiment, the IoT device 100 includes a self-onboarding engine 110, a memory 120, a processor 130, and a communicator 140. The self-onboarding engine 110 is implemented by the processor 130 or separate processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

Upon detecting an error for initiating a connection at the IoT device 100, or detecting that the IoT device 100 is not onboarded, the self-onboarding engine 110 scans for identifying a trusted device 300 and the one or more wireless network(s) 400 in a vicinity of the IoT device 100. Further, the self-onboarding engine 110 establishes a connection with an onboarding server 200 through the trusted device 300 in response to identifying the trusted device 300 in the vicinity of the IoT device 100. Further, the self-onboarding engine 110 sends a list of the one or more identified wireless network(s) 400 to the onboarding server 200 using the connection as shown in A105, in response to identifying the one or more wireless network(s) 400 in the vicinity of the IoT device 100.

Further, the self-onboarding engine 110 receives self-provisioning information as shown in A106, from the onboarding server 200. In an embodiment, the self-provisioning information includes a location (e.g., location ID) of the IoT device 100, a location of the one or more wireless network(s) 400, a room information of the location, and an encrypted security credential (e.g., encrypted password) of the one or more wireless network(s) 400. Further, the self-onboarding engine 110 automatically connects to one of the wireless network(s) 400 and completes onboarding based on the self-provisioning information as shown in A107.

In an embodiment, for establishing the connection with the onboarding server 200 through the trusted device 300, the self-onboarding engine 110 sends an advertisement (e.g., BLE advertisement A101) including an Identifier (ID) of the IoT device 100 to the trusted device 300. The ID of the IoT device 100 can be a serial number of the IoT device 100, a QR code of the IoT device 100, etc. Further, the trusted device 300 creates a temporary connection (e.g., BLE generic attribute profile (BLE GATT) connection A102, Wi-Fi hotspot) with the trusted device 300. Further, the self-onboarding engine 110 receives onboarding metadata A103 including onboarding server information (e.g., an identifier of the onboarding server 200) and authentication information from the trusted device 300 via the temporary connection. Authentication between the IoT device 100 and the onboarding server 200 is challenging each other with encrypted nonce, where a receiving entity decrypts to authenticate a sender. When authentication on both sides is completed, then a secure session key will generate at both ends using an Elliptic-curve Diffie-Hellman (ECDH) method which ensures that the key is same at both ends. Further, the self-onboarding engine 110 establishes the connection with the onboarding server 200 through the trusted device 300 based on the onboarding metadata. In an embodiment, the self-onboarding engine 110 connects to a hotspot A104 of the trusted device 300 for establishing the connection with the onboarding server 200, where the hotspot A104 of the trusted device 300 is a soft Wi-Fi AP and a temporary connection which requires no user intervention.

In an embodiment, for establishing the connection with the onboarding server 200 through the trusted device 300 based on the onboarding metadata, the self-onboarding engine 110 identifies the onboarding server 200 based on the onboarding server information. Further, the self-onboarding engine 110 establishes the connection with the onboarding server 200 through the trusted device 300 based on the onboarding metadata. Further, the self-onboarding engine 110 sends the onboarding metadata A105 to the onboarding server 200. Further, the self-onboarding engine 110 receives a permission to continue the connection with the onboarding server 200 through the trusted device 300 upon successfully authenticating the IoT device 100 by the onboarding server 200 based on the authentication information in the onboarding metadata.

In an embodiment, for automatically onboarding through the one or more wireless network(s) 400 based on the self-provisioning information, the self-onboarding engine 110 disables the connection of the IoT device 100 with the onboarding server 200 or the trusted device 300. Further, the self-onboarding engine 110 determines a nearest wireless network from the one or more wireless network(s) 400 based on the location of the IoT device 100, and the location of the one or more wireless network(s) 400 in the self-provisioning information. Further, the self-onboarding engine 110 determines a security credential (e.g., password) of the nearest wireless network by decrypting the encrypted security credential in the self-provisioning information. Further, the self-onboarding engine 110 automatically onboards through the nearest wireless network by logging in to the nearest wireless network using the security credential.

The memory 120 stores instructions to be executed by the processor 130. The memory 120 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 120 may, in some examples, be considered a non-transitory storage medium. The term "non-transitory" may indicate that the storage medium is not embodied in a carrier wave or a propagated signal. However, the term "non-transitory" should not be interpreted that the memory 120 is non-movable. In some examples, the memory 120 can be configured to store larger amounts of information than its storage space. In certain examples, a non-transitory storage medium may store data that can, over time, change (e.g., in random access memory (RAM) or cache). The memory 120 can be an internal storage unit or it can be an external storage unit of the IoT device 100, a cloud storage, or any other type of external storage.

The processor 130 is configured to execute instructions stored in the memory 120. The processor 130 may be a general-purpose processor, such as a Central Processing Unit (CPU), an Application Processor (AP), or the like, a graphics-only processing unit such as a Graphics Processing Unit (GPU), a Visual Processing Unit (VPU) and the like. The processor 130 may include multiple cores to execute the instructions. The communicator 140 is configured for communicating internally between hardware components in the IoT device 100. Further, the communicator 140 is configured to facilitate the communication between the IoT device 100 and other devices (wireless network 400, trusted device 300) via one or more networks (e.g., Radio technology). The communicator 140 includes an electronic circuit specific to a standard that enables wired or wireless communication.

In an embodiment, the onboarding server 200 includes a self-onboarding engine 210, a memory 220, a processor 230, and a communicator 240. The self-onboarding engine 210 is implemented by the processor 230 or separate processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like. In an embodiment, the onboarding server 200 includes a friendly web server 210A, a policy validator 210B, a device authenticator 210C, a device user-account linker 210D, a provisioning engine 210E, a location finder 210F, and a Wi-Fi locker 210G. The friendly web server 210A, the policy validator 210B, the device authenticator 210C, the device user-account linker 210D, the provisioning engine 210E, the location finder 210F, and the Wi-Fi locker 210G are implemented by the processor 230 or separate processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

The self-onboarding engine 210 receives a request (i.e. self-onboarding request) for connection including onboarding metadata and the list of the one or more wireless network(s) 400 in the vicinity of the IoT device 100 from the IoT device 100 through the trusted device 300 as shown in A105, where the list of the one or more wireless network(s) 400 includes an ID or an Access Point (AP) name of each wireless network 400. The ID of the wireless network 400 can be a serial number of the wireless network 400, a QR code of the wireless network 400, etc. Further, the self-onboarding engine 210 determines whether the IoT device 100 is authorized based on the onboarding metadata. Upon determining that the IoT device 100 is authorized, the self-onboarding engine 210 establishes the connection with the IoT device 100 through the trusted device 300 for providing the self-provisioning information to the IoT device 100 as shown in A106.

In an embodiment, for providing the self-provisioning information to the IoT device 100, the self-onboarding engine 210 determines the location of the IoT device 100 based on the list of the one or more wireless network(s) 400. Further, the self-onboarding engine 210 determines the encrypted security credential and the location of the one or more wireless network(s) 400 from a database 224 based on the list of the one or more wireless network(s) 400. Further, the self-onboarding engine 210 sends the self-provisioning information including the location of the IoT device 100, the location of the one or more wireless network(s) 400, and the encrypted security credential of the one or more wireless network(s) 400 to the IoT device 100.

In an embodiment, the self-onboarding engine 210 receives the onboarded information from onboarded devices (e.g., onboarded IoT device or a master device 500 such as a smartphone used for controlling onboarded IoT device and changing security credentials of wireless network(s) 400) through the one or more wireless network(s) 400, where the onboarded information includes the identifier, the AP name, the security credential and the location of the one or more wireless network(s) 400. Further, the self-onboarding engine 210 encrypts the security credential of the one or more wireless network(s) 400. Further, the self-onboarding engine 210 generates the database 224 of the one or more wireless network(s) 400 using the identifier, the AP name, the location, and the encrypted security credential of the one or more wireless network(s) 400. The friendly web server 210A initiates the self-onboarding procedure for the new IoT device 100 and handles the self-onboarding request and caters self-provisioning information to the IoT device 100. The friendly web server 210A authenticates the trusted device 300 and shares the onboarding metadata to the trusted device 300. The policy validator 210B validates policies 221 for the self-onboarding request and applies restriction of usage of the trusted device 300 to owners, location members, etc. The policies may include:

Number of connected devices consume the internet of the trusted device 300 (e.g., maximum number the connected devices to consume the internet is allowed at any given point of time can be 10), Internet data utilized from the trusted device 300 for device onboarding (e.g., maximum of 50 MB per month can be utilized), Network bandwidth utilization, Self-owned device vs external devices, etc.

The device authenticator 210C authenticates the IoT device 100 and device related operations or command execution, and manages IoT device data for all users. The device user-account linker 210D manages user accounts and associates the user accounts with the IoT device 100 or the onboarded devices. The provisioning engine 210E generates the self-provisioning information, resolves the location ID for the IoT device 100, and prioritizes the Wi-Fi AP list before serving to the IoT device 100. The location finder 210F assists the provisioning engine 210E in resolving the location of the IoT device 100, manages the locations of all IoT devices linked with the user accounts, and assigns the location ID for a new IoT device. The Wi-Fi locker 210G fetches the ID, the location, the AP name, and the encrypted security credential of the Wi-Fi APs from the database 224 by performing a Wi-Fi AP to location mapping.

The memory 220 includes the database 224. The memory 220 stores the policies 221, a list of the onboarded devices 222, and user accounts 223 registered to the onboarding server 200 or the trusted device 300. The memory 220 stores instructions to be executed by the processor 230. The memory 220 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 220 may, in some examples, be considered a non-transitory storage medium. The term "non-transitory" may indicate that the storage medium is not embodied in a carrier wave or a propagated signal. However, the term "non-transitory" should not be interpreted that the memory 220 is non-movable. In some examples, the memory 220 can be configured to store larger amounts of information than its storage space. In certain examples, a non-transitory storage medium may store data that can, over time, change (e.g., in RAM or cache). The memory 220 can be an internal storage unit or it can be an external storage unit of the onboarding server 200, a cloud storage, or any other type of external storage.

The processor 230 is configured to execute instructions stored in the memory 220. The processor 230 may be a general-purpose processor, such as a central processing unit (CPU), an application processor (AP), or the like, a graphics-only processing unit such as a graphics processing unit (GPU), a visual processing unit (VPU) and the like. The processor 230 may include multiple cores to execute the instructions. The communicator 240 is configured for communicating internally between hardware components in the onboarding server 200. Further, the communicator 240 is configured to facilitate the communication between the onboarding server 200 and other devices (trusted device 300) via one or more networks (e.g., Radio technology). The communicator 240 includes an electronic circuit specific to a standard that enables wired or wireless communication.

Although the FIG. 1 shows the hardware components of the system 1000 but it is to be understood that other embodiments are not limited thereon. In other embodiments, the system 1000 may include less or a greater number of components. Further, the labels or names of the components are used only for illustrative purpose and does not limit the scope of the invention. One or more components can be combined together to perform same or substantially similar function for self-onboarding of the IoT device 100.

Figure 2:
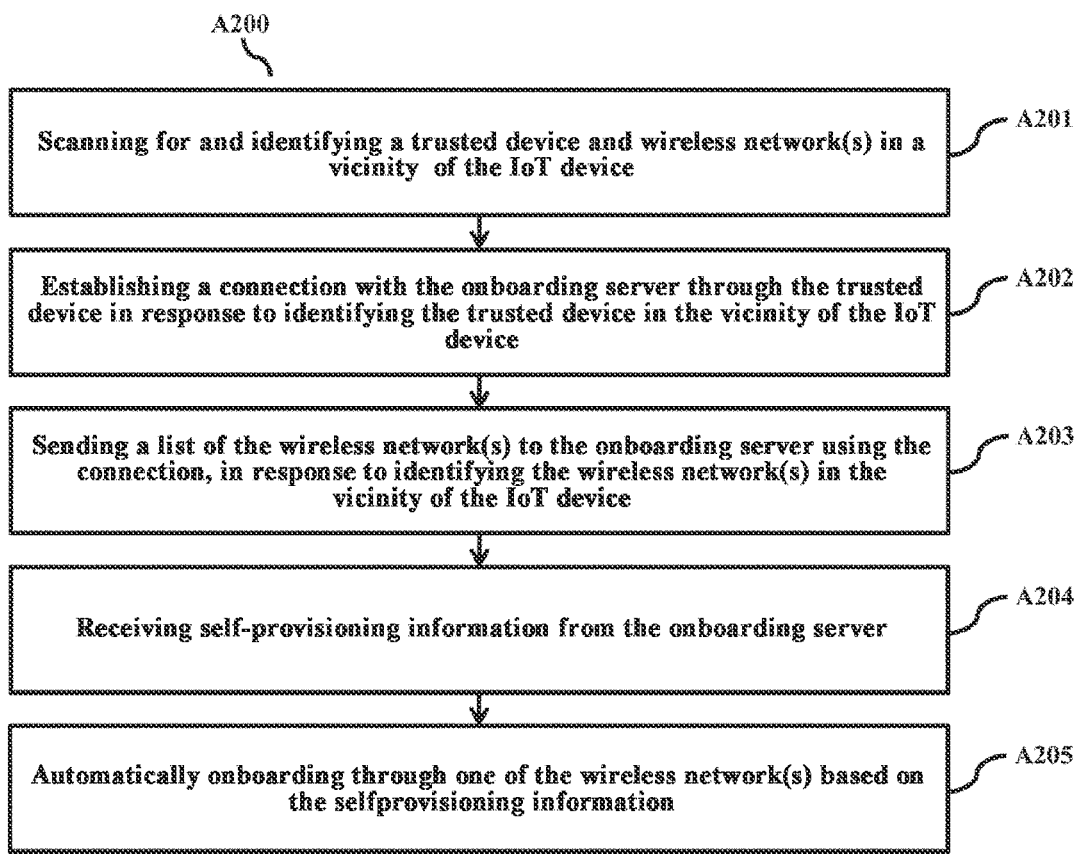
FIG. 2 is a flow diagram illustrating a method for self-onboarding by the IoT device, according to an embodiment.

FIG. 2 is a flow diagram A200 illustrating a method for self-onboarding by the IoT device, according to an embodiment. In an embodiment, the method allows the self-onboarding engine 110 to perform operations A201-A205 of the flow diagram A200. At A201, the method includes scanning for and identifying the trusted device 300 and the wireless network(s) 400 in a vicinity of the IoT device 100. At A202, the method includes establishing the connection with the onboarding server 200 through the trusted device 300 in response to identifying the trusted device 300 in the vicinity of the IoT device 100. At A203, the method includes sending the list of the wireless network 400s to the onboarding server 200 using the connection, in response to identifying the wireless network(s) 400 in the vicinity of the IoT device 100. At A204, the method includes receiving the self-provisioning information from the onboarding server 200. At A205, the method includes automatically onboarding through one wireless network 400 based on the self-provisioning information.

Figure 3:
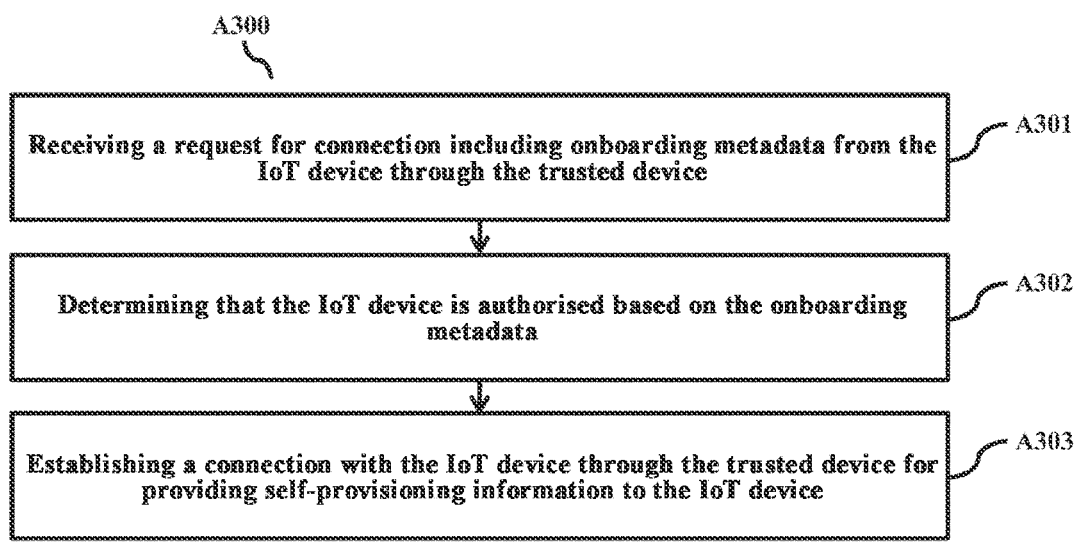
FIG. 3 is a flow diagram illustrating a method for self-onboarding by an onboarding server, according to an embodiment.

FIG. 3 is a flow diagram illustrating a method for self-onboarding by the onboarding server, according to an embodiment. In an embodiment, the method allows the self-onboarding engine 210 to perform operations A301-A303 of the flow diagram A300. At A301, the method includes receiving the request for the connection including the onboarding metadata from the IoT device 100 through the trusted device 300. At A302, the method includes determining that the IoT device 100 is authorized based on the onboarding metadata. At A303, the method includes establishing the connection with the IoT device 100 through the trusted device 300 for providing self-provisioning information to the IoT device 100.

The various actions, acts, blocks, steps, operations, or the like in the flow diagrams (A200, A300) may be performed in the order presented, in a different order, or simultaneously. Further, in some embodiments, some of the actions, acts, blocks, steps, operations, or the like may be omitted, added, modified, skipped, or the like without departing from the scope of the invention.

Figure 4:
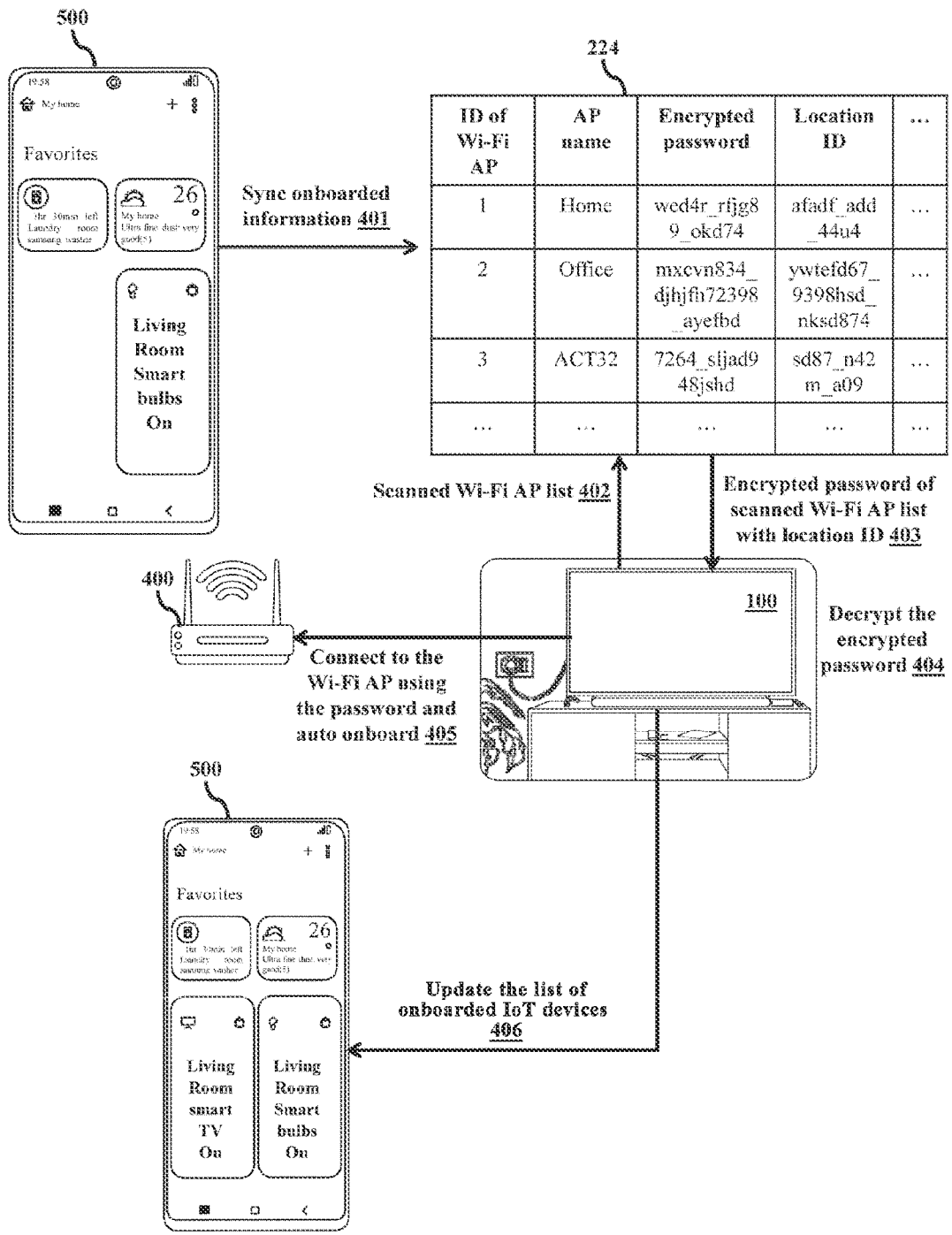
FIG. 4 illustrates an overview of creating a database of wireless networks and self-onboarding of the IoT device, according to an embodiment.

FIG. 4 illustrates an overview of creating the database 224 of the wireless network(s) 400 and self-onboarding of the IoT device 100, according to an embodiment. The master device 500 stores a list of onboarded IoT devices (e.g., smart bulb) and controls operations (e.g., turn ON/OFF, increase/decrease brightness) of the onboarded IoT devices. The master device 500 knows the onboarded information including the wireless network(s) 400 to which the onboarded IoT devices are connected, the ID, the location ID, the security credentials, and the AP name of the wireless network(s) 400. At 401, the master device 500 provides the onboarded information to the onboarding server 200 via an internet connection. The onboarding server 200 encrypts the security credentials using a public key, and stores the ID, the location ID, the encrypted security credentials, and the AP name of the wireless network(s) 400 to the database 224.

Consider, the IoT device 100 (e.g., smart TV) is not onboarded. Upon detecting that the IoT device 100 is not onboarded, the IoT device 100 scans for nearby Wi-Fi APs. At 402, the IoT device 100 connects to the onboarding server 200 via the trusted device 300 and sends the list of scanned Wi-Fi APs including the IDs/name of the scanned Wi-Fi APs to the onboarding server 200. At 403, the onboarding server 200 fetches the location ID, and the encrypted security credentials corresponding to each ID/name of the scanned Wi-Fi APs in the list and sends the location ID, and the encrypted security credentials of the scanned Wi-Fi APs to the IoT device 100. At 404, the IoT device 100 analyzes the received location IDs for identifying the Wi-Fi AP 400 nearest to the IoT device 100. Further, the IoT device 100 decrypts the encrypted security credential of the Wi-Fi AP 400 using a private key, and obtains the security credential. At 405, the IoT device 100 connects to the Wi-Fi AP 400 using the security credential and automatically onboards via the Wi-Fi AP 400. At 406, the master device 500 updates the list of onboarded IoT devices by adding the IoT device 100 (e.g., smart TV) also to the list of onboarded IoT devices.

Figure 5:
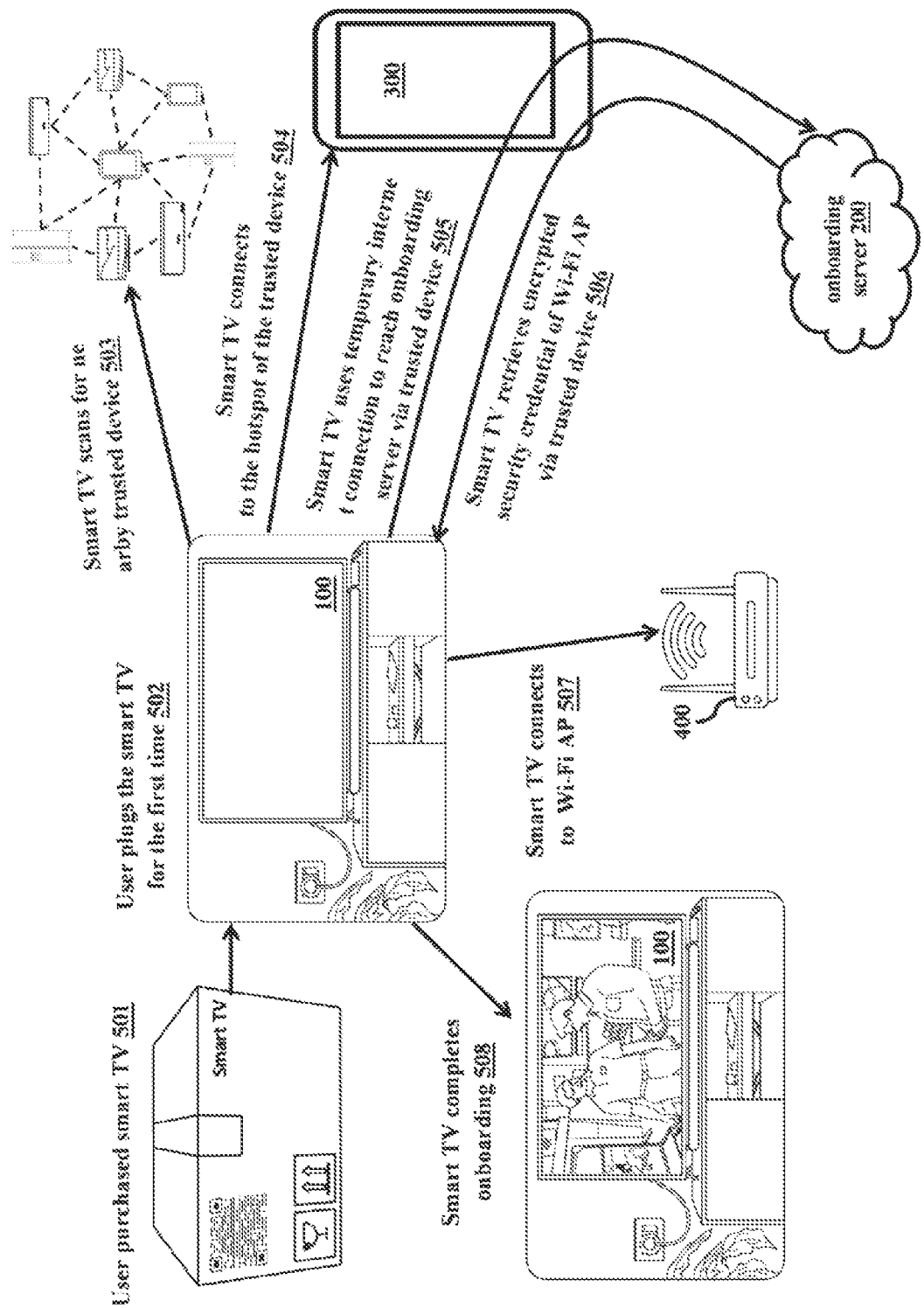
FIG. 5 illustrates an example scenario of self-onboarding the IoT device to a wireless network for a first time, according to an embodiment.

FIG. 5 illustrates an example scenario of self-onboarding the IoT device 100 to the wireless network 400 for the first time, according to an embodiment. At 501, consider the user purchased the IoT device 100 (e.g., smart TV). At 502, the user plugs the smart TV 100 for the first time, and the smart TV 100 is going to onboard for the first time. At 503, upon detecting that the smart TV 100 is not onboarded, the smart TV 100 scans for the nearby trusted device 300. At 504-505, upon detecting the trusted device 300, the smart TV 100 connects to the hotspot of the trusted device 300, and uses the temporary internet connection provided by the hotspot to reach the onboarding server 200. At 506, the smart TV 100 retrieves the encrypted security credential of the nearby Wi-Fi APs from the onboarding server 200. Further, the smart TV 100 decrypts the encrypted security credential using the private key and obtains the security credential. At 507, the smart TV 100 connects to one of the nearby Wi-Fi AP 400 by automatically providing the security credential to the nearby Wi-Fi AP 400 for accessing the internet. At 508, the smart TV 100 automatically completes the onboarding process by accessing the internet via the nearby Wi-Fi AP 400.

Unlike existing methods and systems, a manual onboarding of the IoT device 100 at the Wi-Fi AP is avoided using the proposed method. Also, the user need not be present with the master device (e.g., smartphone) during onboarding.

Figure 6:
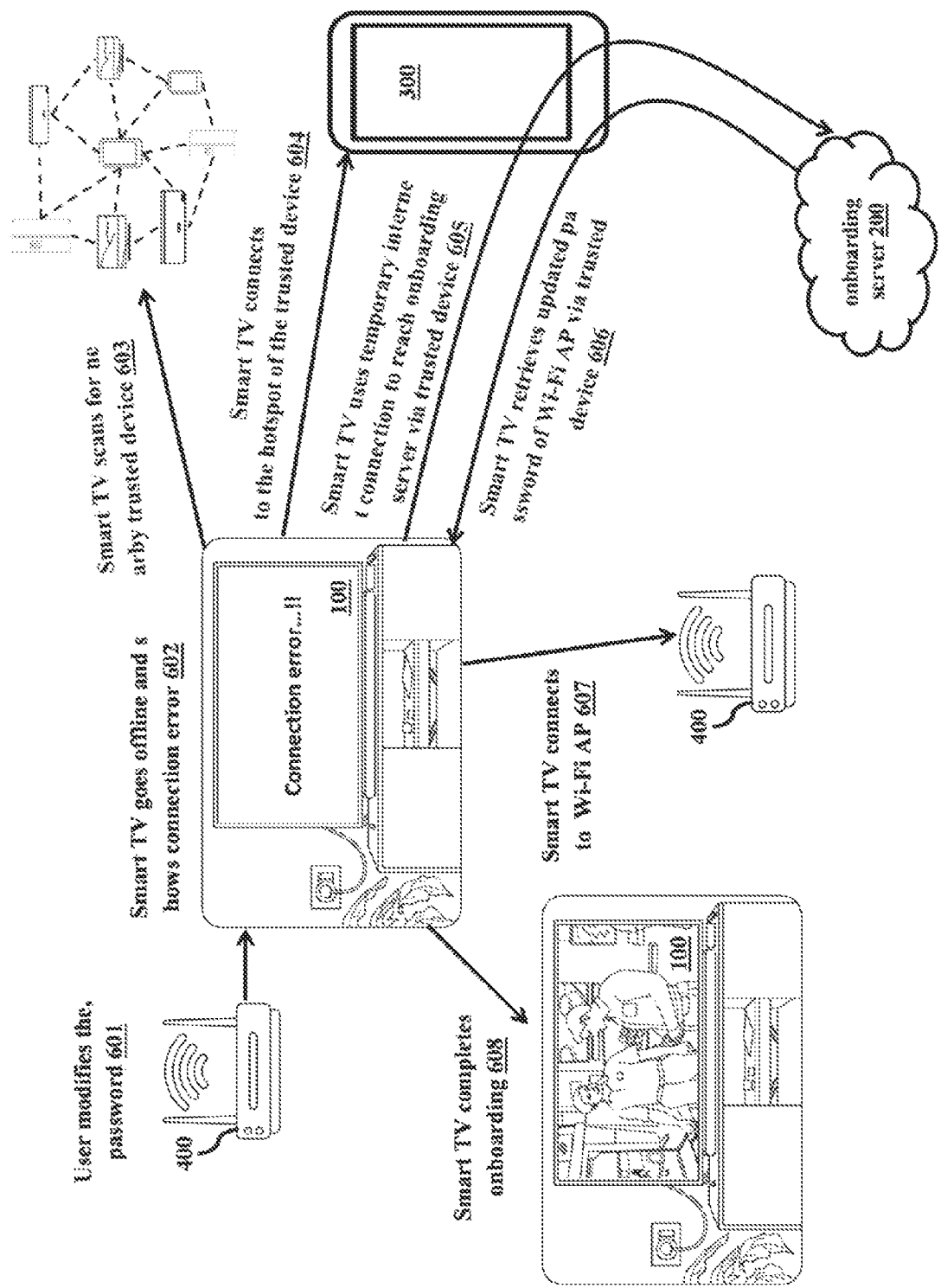
FIG. 6 illustrates an example scenario of self-onboarding the IoT device to the wireless network due to changing a security credential of the wireless network, according to an embodiment.

FIG. 6 illustrates an example scenario of self-onboarding the IoT device 100 to the wireless network 400 due to changing the security credential of the wireless network, according to an embodiment. Consider, the IoT device 100 (e.g., smart TV) is already onboarded and connected to the Wi-Fi AP 400. Later, at 601 the user has changed the password of the Wi-Fi AP 400. The updated password of the Wi-Fi AP 400 was synchronized with the boarding server 200. The boarding server 200 encrypts the updated password of the Wi-Fi AP 400 using the public key and stores the encrypted updated password in the database 224. The smart TV 100 tries to access the internet via the Wi-Fi AP 400 using the previous password but got a rejection from the Wi-Fi AP 400.

At 602, the smart TV 100 goes offline and shows a connection error due to the rejection. At 603, upon detecting the connection error or the offline for a pre-defined threshold time, the smart TV 100 starts the BLE scan and advertisement for finding the nearby trusted device 300. At 604-605, upon finding the trusted device 300, the smart TV 100 connects to the hotspot of the trusted device 300, and uses the temporary internet connection provided by the hotspot to reach the onboarding server 200. At 606, the smart TV 100 retrieves the encrypted updated password of the Wi-Fi AP 400 from the onboarding server 200. Further, the smart TV 100 decrypts the encrypted updated password using the private key and obtains the updated password. At 607, the smart TV 100 connects to one of the Wi-Fi AP 400 by automatically providing the updated password to the Wi-Fi AP 400 for accessing the internet. At 608, the smart TV 100 automatically completes the onboarding process by accessing the internet via the Wi-Fi AP 400.

Unlike existing methods and systems, the proposed method allows the IoT device 100 to change from an offline state to a ready-to-use state in less than a minute, and avoids the manual re-configuration of the wireless network 400 in the IoT device 100.

Figure 7:
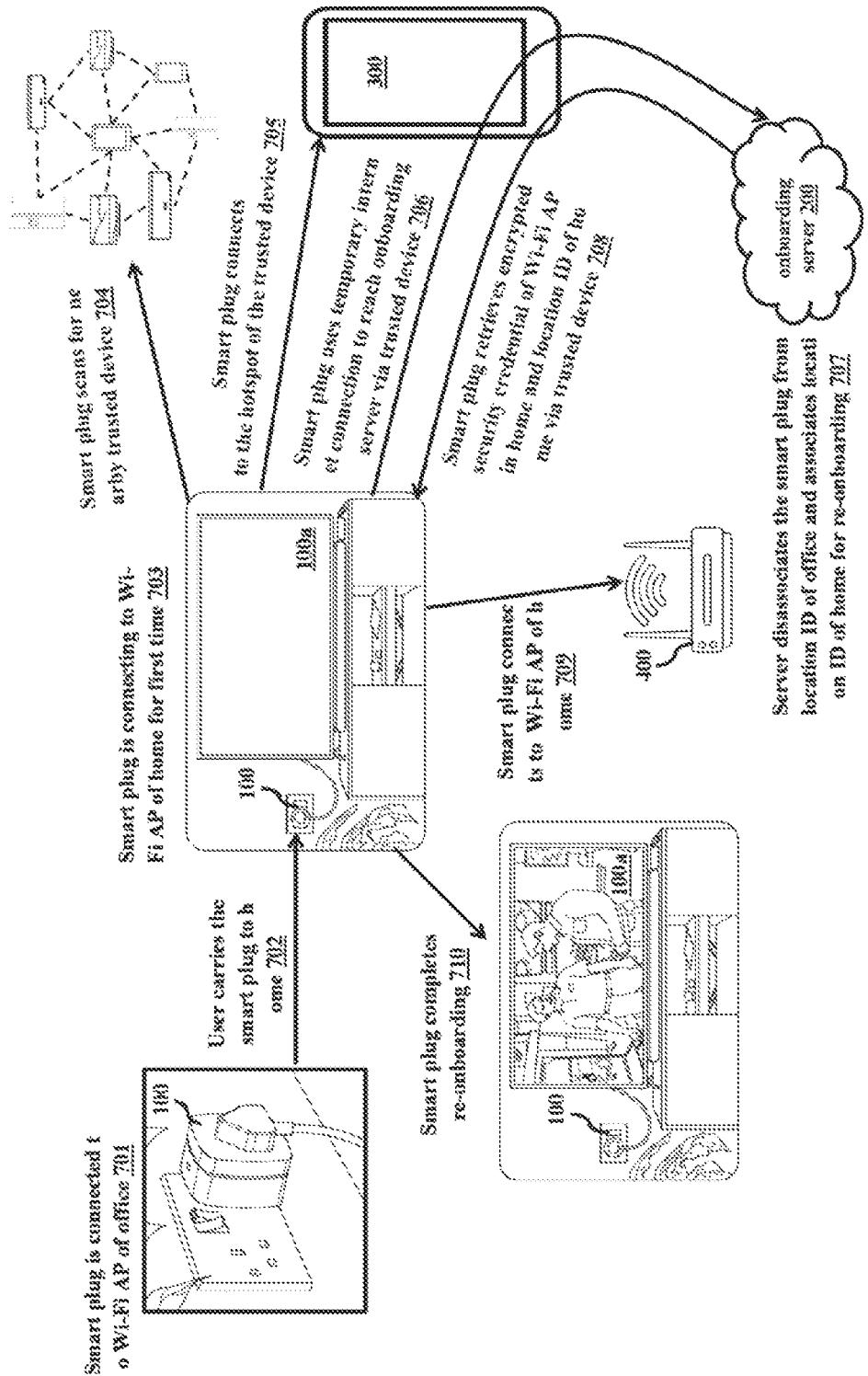
FIG. 7 illustrates an example scenario of self-onboarding the IoT device to the wireless network due to changing a location of the IoT device, according to an embodiment.

FIG. 7 illustrates an example scenario of self-onboarding the IoT device 100 to the wireless network 400 due to changing the location of the IoT device 100, according to an embodiment. Consider, at 701 the IoT device 100 (e.g., smart plug) is onboarded and connected to a Wi-Fi AP in an office of the user. So, the smart plug 100 is associated with the location ID of the office. At 702, later the user carries the smart plug 100 from the office to a home of the user. At 703, the smart plug 100 has electrically connected to a power supply of the home location to power up/down the smart TV (100*a*) in the home location. The internet is required for the powering up/down operation of the smart plug 100. But, due to changing the location of the smart plug 100, when the smart plug 100 tries to access the internet via the Wi-Fi AP 400 in the home, the Wi-Fi AP 400 detects a mismatch in the location ID associated with the smart plug 100 and the location ID associated with the Wi-Fi AP 400 in the home. Due to the mismatch in the location IDs, the Wi-Fi AP 400 does not allow the smart plug 100 to access the internet via the Wi-Fi AP 400 in the home.

At 704, upon detecting the connection error at the smart plug 100, the smart plug 100 scans for the nearby trusted device 300. At 705-706, upon detecting the trusted device 300, the smart plug 100 connects to the hotspot of the trusted device 300, and uses the temporary internet connection provided by the hotspot to reach the onboarding server 200. At 707, the onboarding server 200 disassociates the smart plug 100 from the location ID of the office and associates the smart plug 100 with the location ID of the home for re-onboarding. At 708, the smart plug 100 retrieves the encrypted security credential of the Wi-Fi AP in the home and the location ID of the home. Further, the smart plug 100 decrypts the encrypted security credential using the private key and obtains the security credential. At 709, the smart plug 100 connects to the Wi-Fi AP 400 in the home by automatically providing the security credential to the Wi-Fi AP 400 for accessing the internet. At 710, upon successfully matching the location IDs associated with the smart plug 100 and the Wi-Fi AP 400, and receiving the correct security credential, the Wi-Fi AP 400 allows the smart plug 100 to access the internet via the Wi-Fi AP 400. Further, the smart plug 100 automatically re-onboards using the internet.

The proposed method is manual effort in dis-association of the IoT device 100 from the previous location ID, re-association of the IoT device 100 with the new location ID, and re-onboarding of the IoT device 100.

Figure 8:
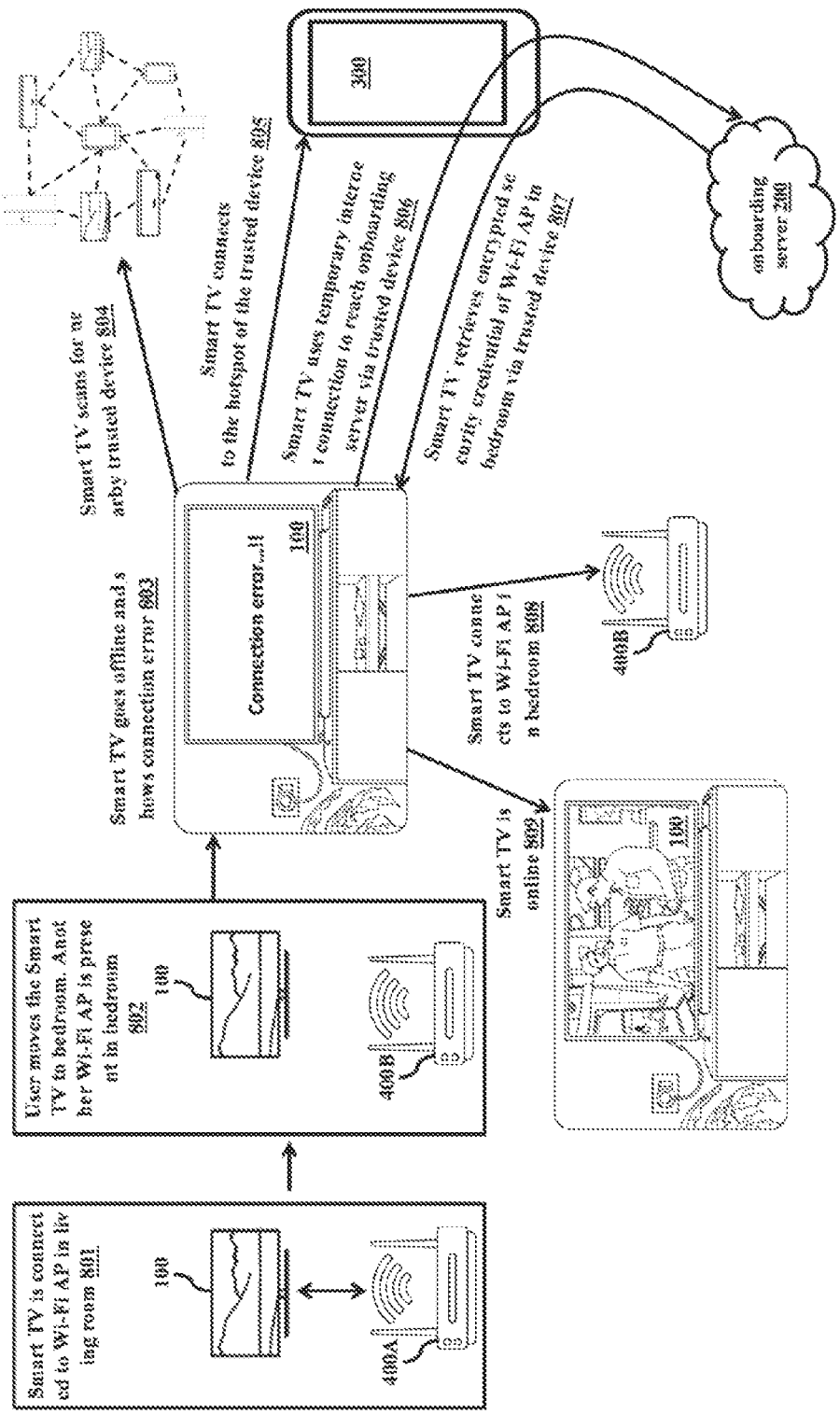
FIG. 8 illustrates an example scenario of self-onboarding the IoT device to the wireless network due to changing the wireless network within same location, according to an embodiment.

FIG. 8 illustrates an example scenario of self-onboarding the IoT device 100 to the wireless network due to changing the wireless network within the same location, according to an embodiment. Consider, at 801 the IoT device 100 (e.g., smart TV) is onboarded and connected to a Wi-Fi AP 400A in a living room of the home of the user. So, the smart TV 100 only contains the security credential of the Wi-Fi AP 400A in the living room. At 802, later the user shifts the smart TV 100 from the living room to a bedroom of the home, where a Wi-Fi AP 400B is located in the bedroom. The security credential of the Wi-Fi AP 400A is different from the security credential of the Wi-Fi AP 400B. At 803, upon turning on the smart TV 100, the smart TV 100 tries to access the internet via the Wi-Fi AP 400B by providing the security credential of the Wi-Fi AP 400A to the Wi-Fi AP 400B. The Wi-Fi AP 400B detects a mismatch in the security credential provided by the smart TV 100 and the security credential configured with the Wi-Fi AP 400B. Due to the mismatch in the security credentials, the Wi-Fi AP 400B rejects the smart TV 100 from accessing the internet via the Wi-Fi AP 400B

At 803, the smart TV 100 goes offline and shows a connection error due to the rejection. At 804, upon detecting the connection error, the smart TV 100 scans for the nearby trusted device 300. At 805-806, upon detecting the trusted device 300, the smart TV 100 connects to the hotspot of the trusted device 300, and uses the temporary internet connection provided by the hotspot to reach the onboarding server 200. At 807, the smart TV 100 retrieves the encrypted security credential of the Wi-Fi AP 400B from the onboarding server 200. Further, the smart TV 100 decrypts the encrypted security credential using the private key and obtains the security credential. At 808, the smart TV 100 connects to the Wi-Fi AP 400B in the bedroom by automatically providing the security credential to the Wi-Fi AP 400B for accessing the internet. At 809, the smart TV 100 automatically completes the onboarding process and accesses the internet via the Wi-Fi AP 400B.

Figure 9:
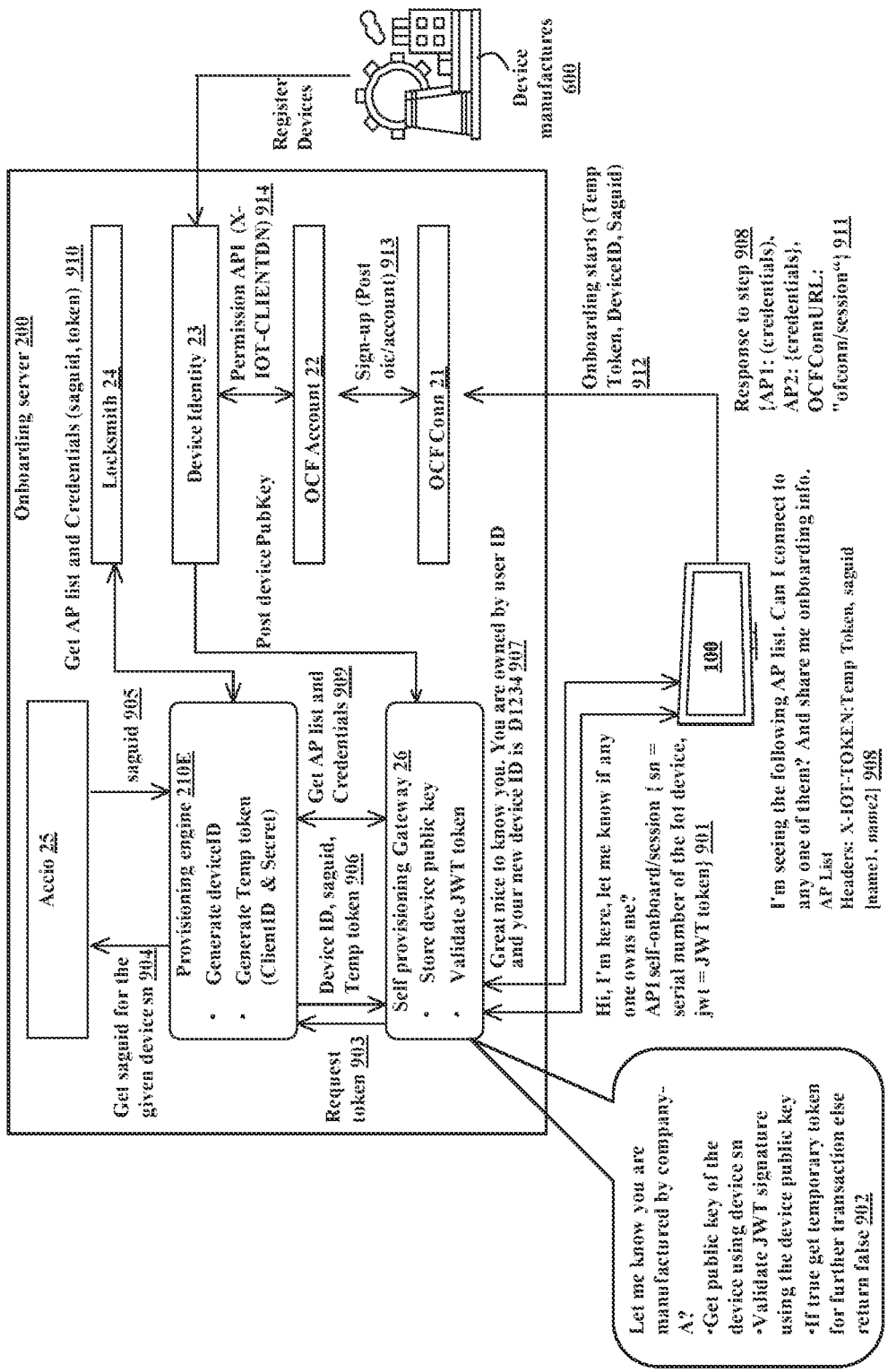
FIG. 9 illustrates a flow in an example scenario of self-onboarding the IoT device, according to an embodiment.

FIG. 9 illustrates a flow in an example scenario of self-onboarding the IoT device 100, according to an embodiment. Consider, the IoT device 100 (e.g., smart TV) is linked with the user account, the IoT device 100 has internet access, and the IoT device 100 knows the onboarding server 200 Uniform Resource Locator (URL) through the trusted device 300. In an embodiment, the onboarding server 200 includes a self-provisioning gateway 26, the provisioning engine 210E, an accio 25, a locksmith 24 (also called as Wi-Fi locker 210G), a device identity 23, an Open Connectivity Foundation (OCF) account 22, and an OCF connection 21. A device manufacturer of the IoT device 100 registers all the manufactured IoT devices with the device identity 23, where the device identity 23 posts the public key of all the registered IoT devices to the self-provisioning gateway 26. The self-provisioning gateway 26 stores the device's public key and validates a JWT token. The provisioning engine 210E generates the device ID, and generates a temporary token that includes a client ID and a secret.

At 901, the IoT device 100 checks whether anyone owns the IoT device 100 with the onboarding server 200 by creating an application programming interface (API) self-onboard/session {sn=serial number of the IoT device 100, jwt=JWT token}. At 902, the self-provisioning gateway 26 checks whether the IoT device 100 is manufactured by the device manufacturer 600 who owns the onboarding server 200 by obtaining the public key of the IoT device 100 using the sn, and validating the JWT token using the device public key. If the JWT token is validated. At 903, the self-provisioning gateway 26 requests for the temporary token to the provisioning engine 210E. At 904-905, the provisioning engine 210E gets a manufacturer account global user identifier (saguid) for the given device sn from the accio 25. At 906, the provisioning engine 210E sends the device ID, saguid, and the temporary token to the self-provisioning gateway 26. At 907, upon getting the temporary token, the self-provisioning gateway 26 continues further transaction else returns an error status to the IoT device 100.

Upon getting the temporary token, the self-provisioning gateway 26 identifies the IoT device 100, informs a user ID owned the IoT device 100, and device ID of the IoT device 100. At 908, the IoT device 100 scans for the Wi-Fi APs and provides the scanned Wi-Fi AP list to the onboarding server 200. Further, the IoT device 100 requests the onboarding server 200 for the permission to connect to any one of the Wi-Fi Aps and the onboarding information. The scanned Wi-Fi AP list includes Headers: X-IOT-TOKEN:Temp Token, saguid, [name1, name2]. At 908, the onboarding server 200 provides a response includes the security credentials of a few Wi-Fi APs to the IoT device 100. At 912, the IoT device 100 starts onboarding using the security credentials by providing the temporary token, the device ID, and the saguid to the OCF connection 21. At 913, the OCF connection 21 starts signing up using a post oic/account at the OCF account 22. At 912, the OCF account 22 contains permission API (X-IOT-CLIENTDN) from the device identity 23.

Figure 10:
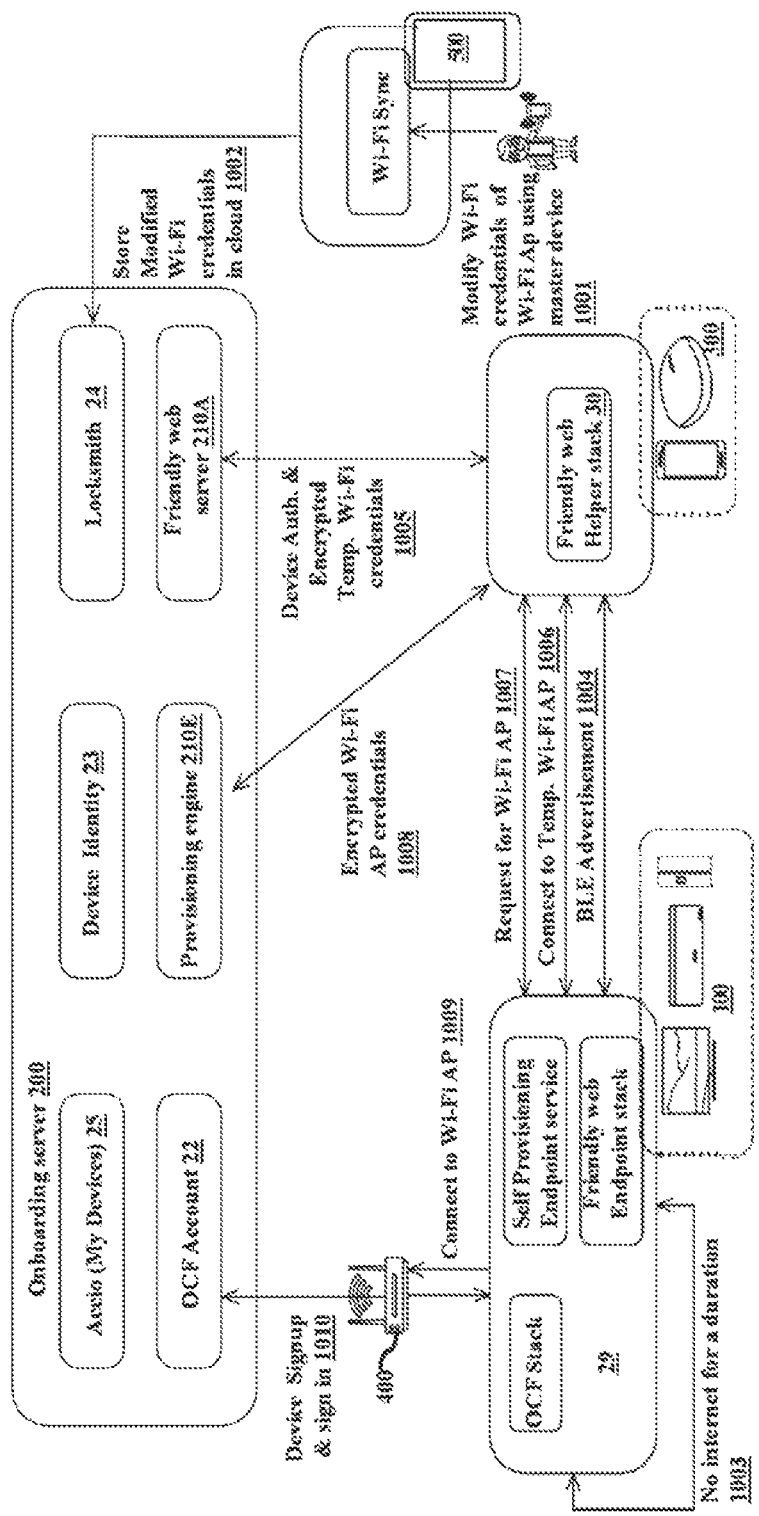
FIG. 10 is a flow diagram illustrating auto-reconfiguration of the IoT device, according to an embodiment.

FIG. 10 is a flow diagram illustrating the auto-reconfiguration of the IoT device 100, according to an embodiment. In an embodiment, the onboarding server 200 includes the provisioning engine 210E, the accio 25, the locksmith 24, the device identity 23, the OCF account 22, and the friendly web server 210A. At 1001, consider, the user modified the security credential of the Wi-Fi AP 400 using the master device 500. At 1002, the master device 500 synchronizes the updated security credential with the locksmith 24. At 1003, due to modifying the security credential, the IoT device 100 cannot access the internet via the Wi-Fi AP 400. At 1004, after waiting for internet access for the threshold duration, the IoT device 100 finds and connects to the trusted device 300. At 1005, a friendly web helper stack 30 of the trusted device 300 requests to the friendly web server 210A for handling the IoT device 100.

Further, the friendly web server 210A authenticates the IoT device 100 and provides a temporary encrypted Wi-Fi credential to the friendly web helper stack 30. Further, the friendly web helper stack 30 shares the temporary encrypted Wi-Fi credential to the IoT device 100. At 1006, the IoT device 100 connects to the hotspot of the trusted device 300 using the temporary encrypted Wi-Fi credential. At 1007-1008, the IoT device 100 retrieves the encrypted updated security credential of the Wi-Fi AP 400 from the provisioning engine 210E via the friendly web helper stack 30. At 1006, the IoT device 100 determines the updated security credential from the encrypted updated security credential and connects to the Wi-Fi AP 400 using the updated security credential. At 1010, the IoT device 100 accesses the internet and becomes online via the Wi-Fi AP 400.

Figure 11:
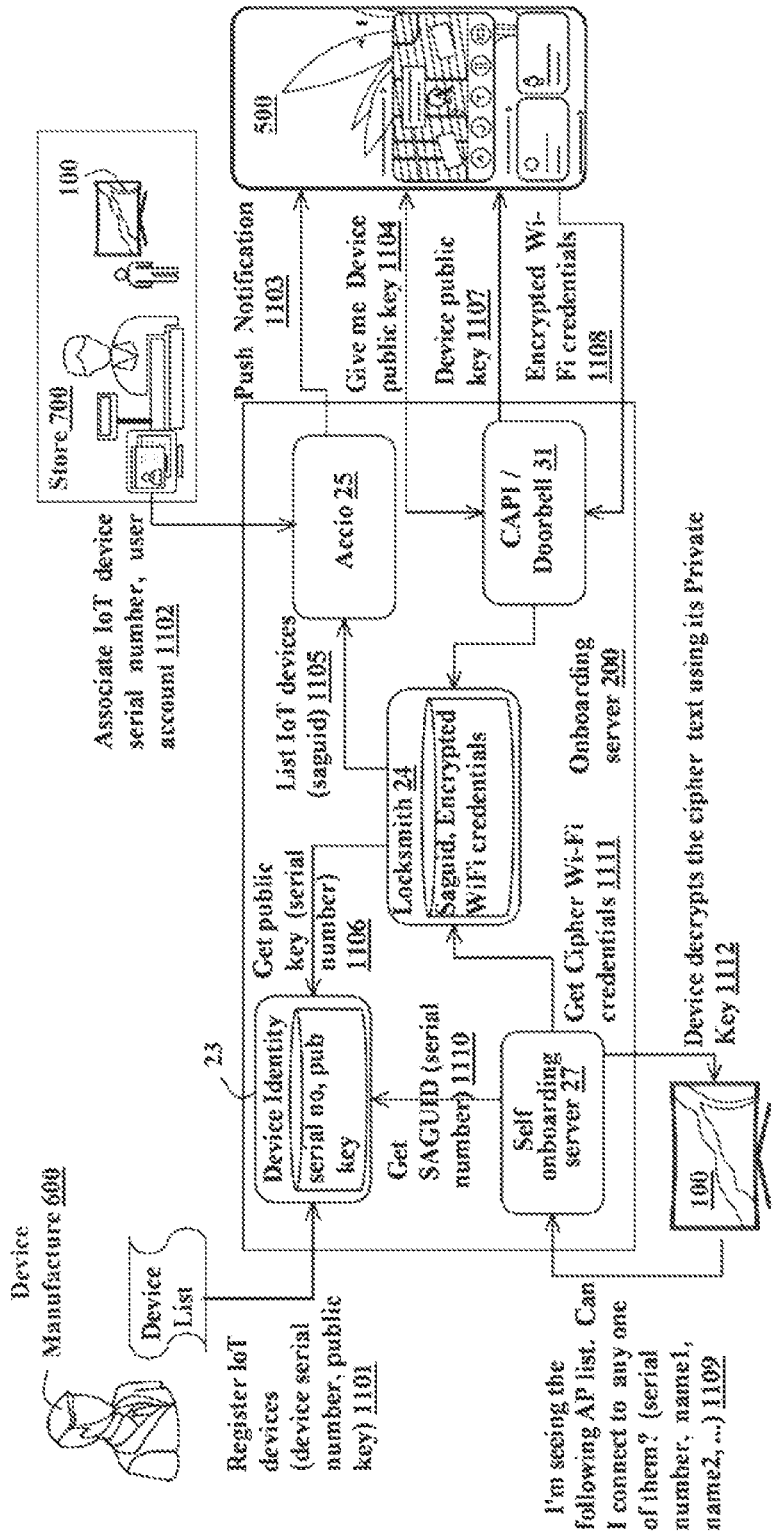
FIGS. 11-12 illustrate example scenarios of obtaining the security credential by the IoT device, according to an embodiment.
Figure 12:
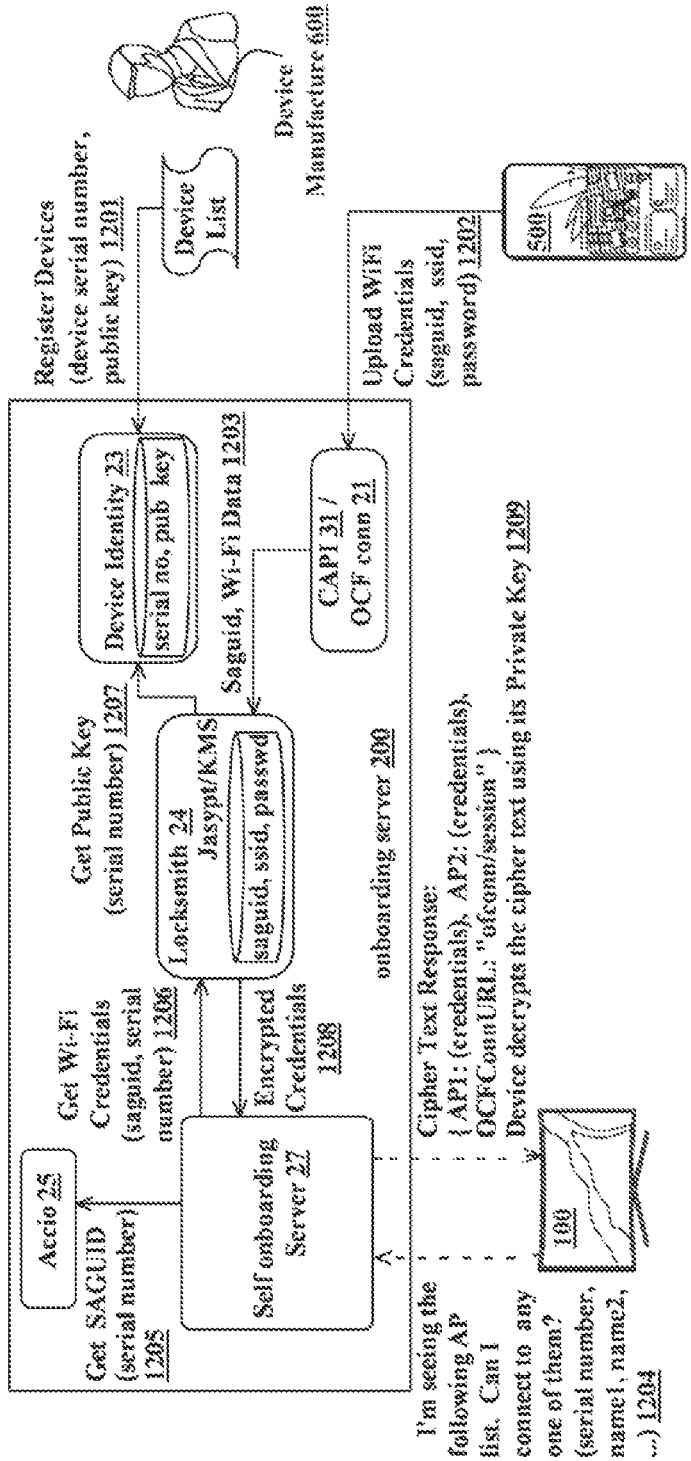

FIGS. 11-12 illustrate example scenarios of obtaining the security credential by the IoT device 100, according to an embodiment. In an embodiment, the onboarding server 200 includes the accio 25, the locksmith 24, the device identity 23, an OCF account 22, a self-onboarding server 27, the OCF connection 21 and a Client Application Programming Interface (CAPI)/doorbell 31.

With reference to the FIG. 11, at 1101 the IoT device manufacture 600 registers the IoT device 100 by providing the device serial number, the public key, etc. to the device identity 23. At 1102, a seller of the IoT device 100 associates the serial number of the IoT device 100 with the user account at a store 700 while selling the IoT device 100 to the user. At 1103, upon associating the serial number of the IoT device 100 with the user account, the master device 500 of the user receives a push notification regarding the association from the accio 25, where the user account is activated in the master device 500 to receive notifications from the onboarding server 200. At 1104, the master device 500 requests for the public key of the IoT device 100 to the CAPI/doorbell 31 by providing the serial number. Further, the CAPI/doorbell 31 forwards the request to the locksmith 24. At 1105, the locksmith 24 obtains the list IoT devices based on the saguid from the accio 25.

At 1106, the locksmith 24 obtains the public key based on the serial number. Further, the locksmith 24 provides the public key to the CAPI/doorbell 31. At 1107, the CAPI/doorbell 31 forwards the public key to the master device 500. At 1108, the master device 500 requests for the encrypted security credentials of the nearby Wi-Fi AP to the CAPI/doorbell 31. At 1109, the IoT device 100 provides the scanned Wi-Fi AP list to the self-onboarding server 27 and requests for the permission to connect to any one of Wi-Fi AP. At 1110, the self-onboarding server 27 obtains the saguid based on the serial number of the IoT device 100 from the device identity 23. At 1111, the self-onboarding server 27 obtains the encrypted security credential from the locksmith 24. At 1112, the self-onboarding server 27 sends the encrypted security credential to the IoT device 100, and the IoT device 100 decrypts the encrypted security credential using the private key of the IoT device 100.

With reference to the FIG. 12, at 1201 the IoT device manufacture 600 registers the IoT device 100 by providing the device serial number, the public key, etc. to the device identity 23. At 1202, the master device 500 uploads the of the security credential includes the saguid, a Service Set Identifier (ssid), the password of the Wi-Fi APs to the CAPI 31 or the OCF connection 21. At 1203, the CAPI 31 or the OCF connection 21 provides the saguid and the Wi-Fi data (e.g., Wi-Fi AP name, passphrase, mac address, frequency, security type, etc.) to the locksmith 24. At 1204, the IoT device 100 provides the scanned Wi-Fi AP list to the self-onboarding server 27 and requests for the permission to connect to any one of Wi-Fi AP. At 1205, the self-onboarding server 27 obtains the saguid based on the serial number of the IoT device 100 from the accio 25. At 1206-1207, the self-onboarding server 27 obtains the encrypted security credential from the locksmith 24. At 1209, the self-onboarding server 27 sends the encrypted security credential to the IoT device 100, and the IoT device 100 decrypts the encrypted security credential using the private key of the IoT device 100.

Figure 13:
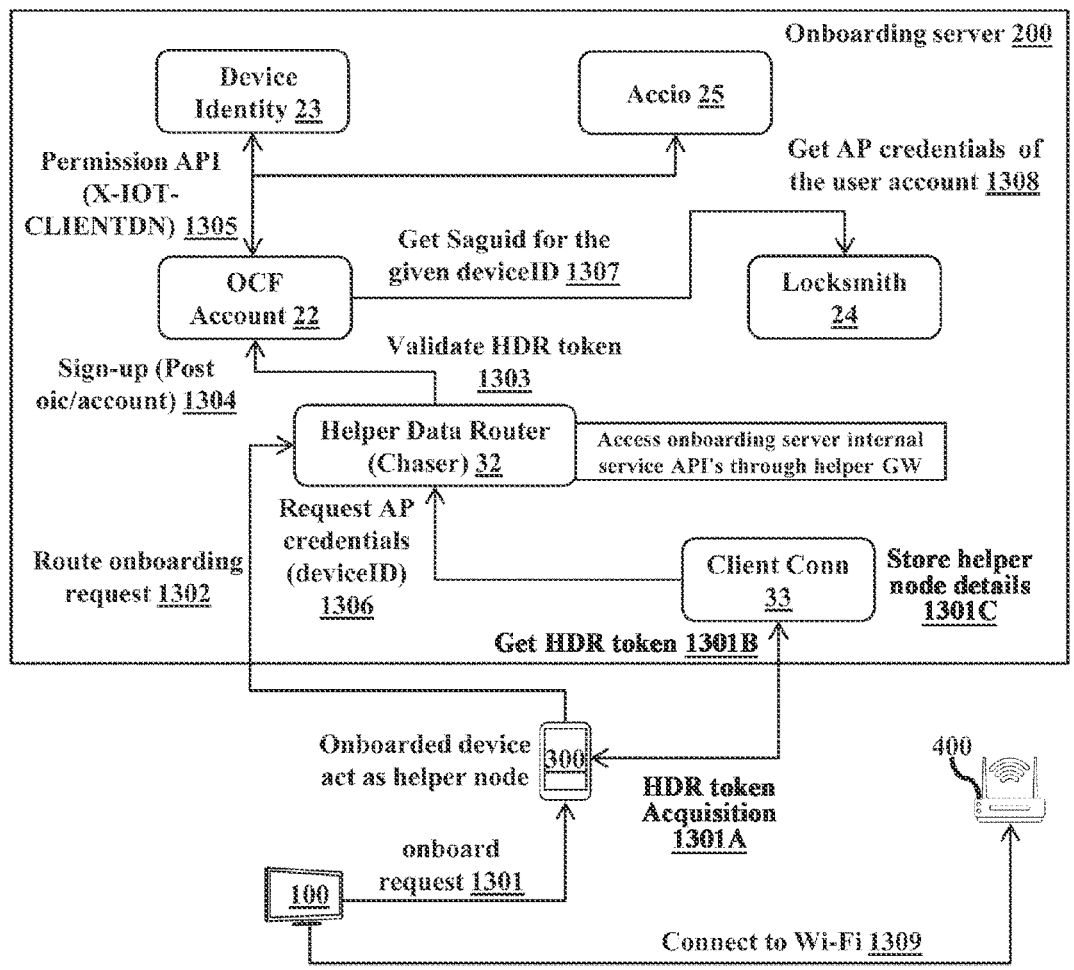
FIG. 13 is a flow diagram illustrating authentication of a trusted device, according to an embodiment.

FIG. 13 is a flow diagram illustrating authentication of the trusted device 300, according to an embodiment. In an embodiment, the onboarding server 200 includes the accio 25, the locksmith 24, the device identity 23, the OCF account 22, a helper data router (chaser) 32, and a client connection 33. The helper data router 32 has an access to onboarding server internal service APIs through helper gateway. Consider, the user account is linked with the IoT device 100 that is currently in the offline state. The API has permission to share the Wi-Fi AP's security credential to the IoT device 100. Operations 1301A-1301C should complete by the onboarded device to operate the onboarded device as the trusted device 300. The onboarded device must acquire Helper Data Router (HDR) token to permanently operate as the trusted device 300. At 1301A-1301B, the onboarded device obtains the HDR token from the client connection 33.

At 1301c, the client connection 33 stores detail of the onboarded device that requested for operating as the trusted device. At 1301, the IoT device 100 sends the onboarding request to the trusted device 300. At 1302, the trusted device 300 routes the onboarding request to the helper data router 32. At 1303-1304, the helper data router 32 validates the HDR token of the trusted device 300 by signing up using the post oic/account at the OCF account 22. At 1305, the OCF account 22 uses the permission API (X-IOT-CLIENTDN) from the accio 25, and the device identity 23. At 1306, client connection 33 requests for the security credentials based on the device ID to the helper data router 32. At 1307-1308, the OCF account 22 gets the saguid for the given device ID and the encrypted security credentials of the user account from the locksmith 24. At 1309, the IoT device 100 connects to the Wi-Fi AP 400 upon receiving the encrypted security credentials from the onboarding server 200.

Figure 14:
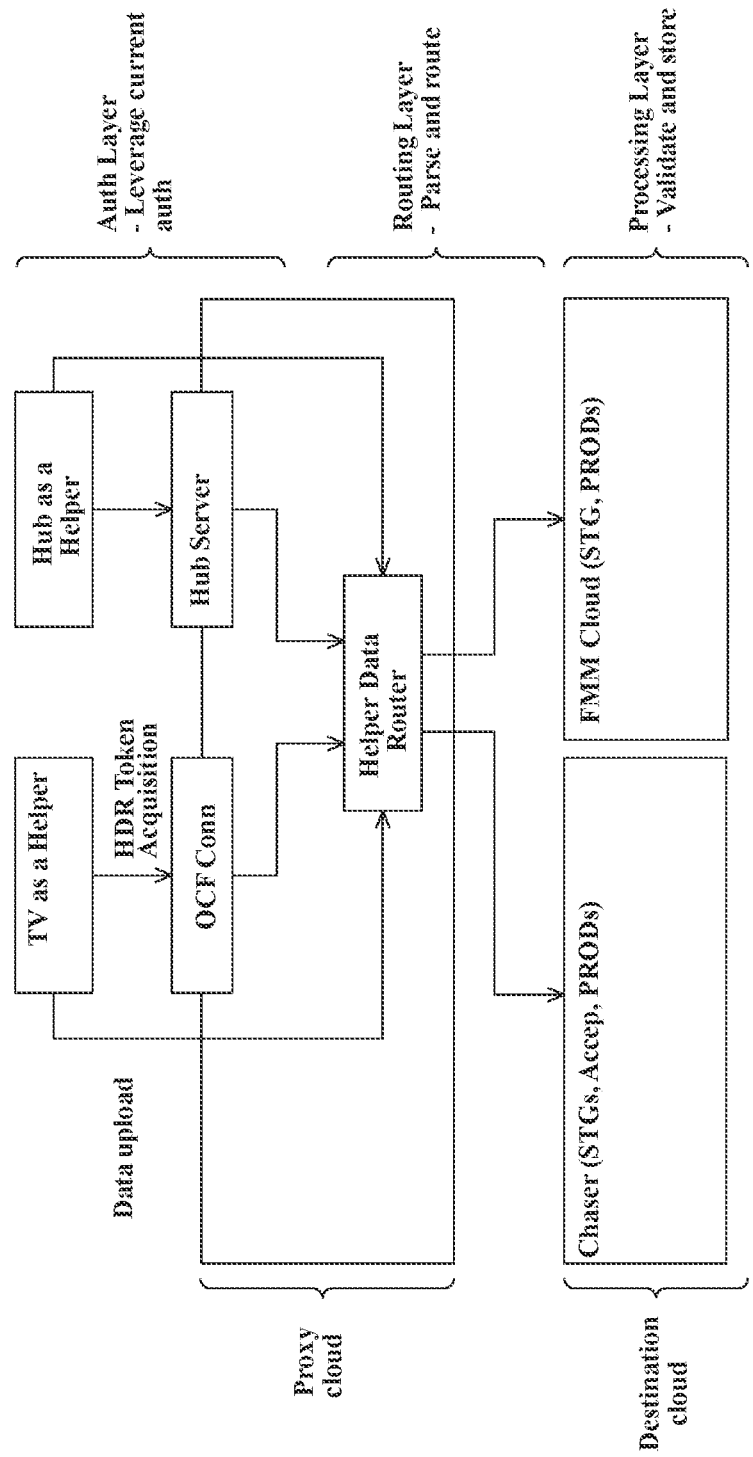
FIG. 14 is a flow diagram illustrating registration of the trusted device at the onboarding server, according to an embodiment.

FIG. 14 is a flow diagram illustrating registration of the trusted device 300 at the onboarding server 200, according to an embodiment. In an embodiment, the onboarding server 200 includes a destination cloud and a proxy cloud. The destination cloud includes a chaser with staging, Acceptance, Production, and a find my mobile (FMM) cloud with staging, PRODs. The proxy cloud includes the OCF connection 21, the helper data router 32, and a hub server. The onboarded device such as a smart TV that wishes to operate as the trusted device obtains the HDR token from the OCF connection 21. Also, a hub that want to operate as the trusted device obtains the HDR token from the hub server. The OCF connection 21 and the hub server communicates with the helper data router 32 for allowing the onboarded device or the hub to operate as the trusted device. The helper data router 32 also receives data from the onboarded device. The helper data router 32 communicates with the chaser and the FMM cloud. The onboarded device, the hub, OCF connection 21 and the hub server are arranged at an authentication layer that leverages current authentication. The helper data router 32, the chaser, and the FMM cloud are arranged at a routing layer that do parsing and routing. The chaser, and the FMM cloud are arranged at a processing layer that do validation and storing.

Figure 15:
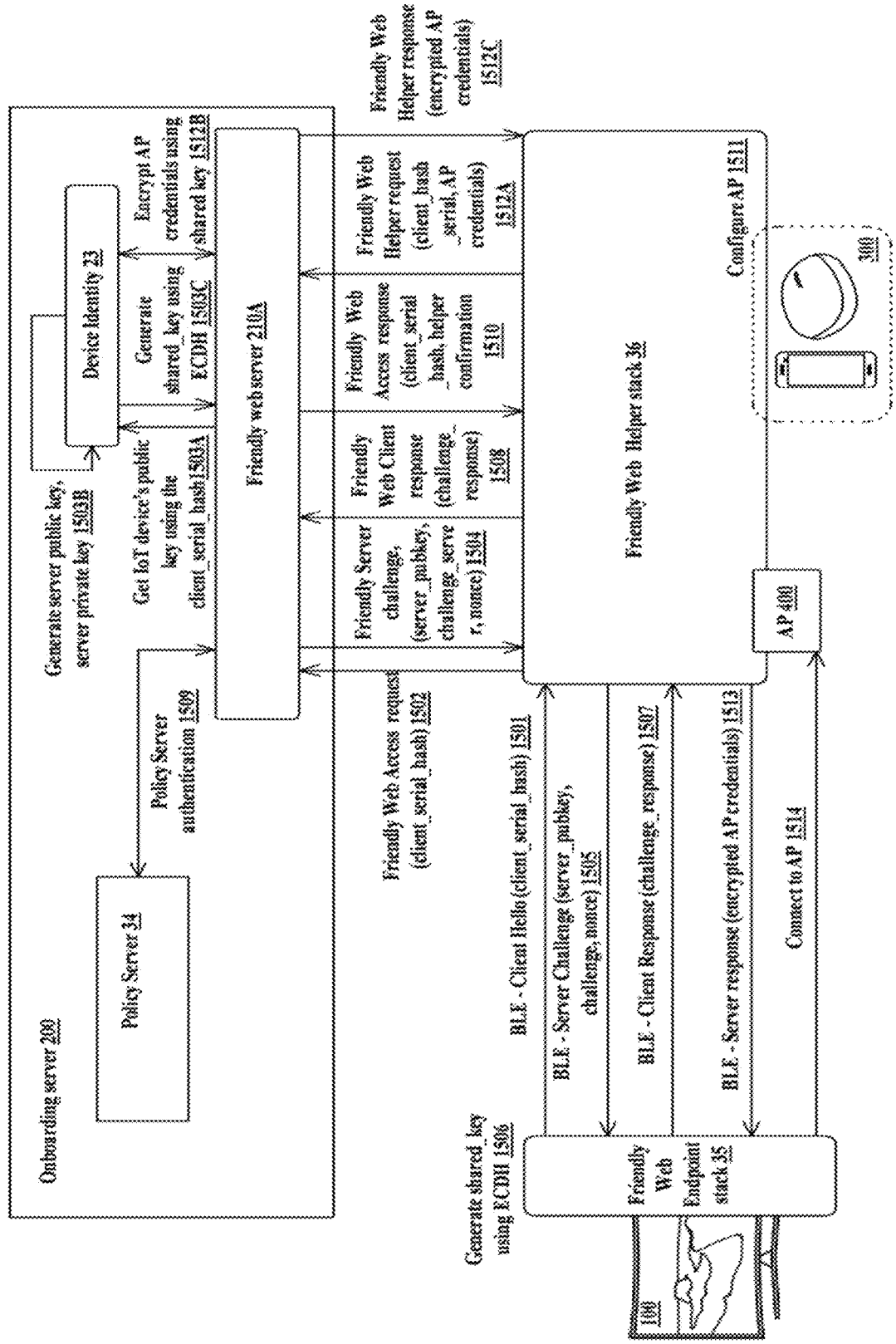
FIG. 15 is a flow diagram illustrating authentication of the IoT device at the trusted device, according to an embodiment.

FIG. 15 is a flow diagram illustrating authentication of the IoT device 100 at the trusted device 300, according to an embodiment. In an embodiment, the onboarding server 200 includes a policy server 34, the friendly web server 210A, and the device identity 23. At 1501, a friendly web endpoint stack 35 of the IoT device 100 sends the BLE advertisement (i.e. Client Hello includes client_serial_hash) to the friendly web helper stack 36 of the trusted device 300. At 1502, the friendly web helper stack 36 sends a friendly web access request includes the client_serial_hash to the friendly web server 210A. At 1503A, the friendly web server 210A get IoT device's public key using the client_serial_hash from the from the device identity 23. At 1503B, the device identity 23 generates a server public key and a server private key. At 1503C, the device identity 23 generate a shared key using ECDH, and shares to the friendly web server 210A.

At 1504, the friendly web server 210A sends a friendly Server challenge includes the server public key, a challenge server, and a nonce. At 1505, the friendly web helper stack 36 sends a BLE server challenge includes the server public key, and the challenge, and the nonce to the friendly web endpoint stack 35. At 1506, the friendly web endpoint stack 35 generates the shared key using the ECDH. At 1507, the friendly web endpoint stack 35 sends a BLE client response includes challenge_response to the friendly web helper stack 36. At 1508, the friendly web helper stack 36 sends a friendly web client response includes a challenge response to the friendly web server 210A. At 1509-1510, the friendly web server 210A authenticates the policy server 34, and sends a friendly web access response includes the client_serial_hash and a helper confirmation to the friendly web helper stack 36.

At 1511, the friendly web helper stack 36 configures the Wi-Fi AP 400. At 1512A, the friendly web helper stack 36 sends a friendly web helper request includes the client_hash_serial, and the AP's security credential to the friendly web server 210A. At 1512B, the device identity 23 encrypts the AP's security credential using the shared key, and shares the encrypted AP's security credential to the friendly web server 210A. At 1512C, the friendly web server 210A sends a friendly web helper response includes the encrypted AP's security credential to the friendly web helper stack 36. At 1513, the friendly web helper stack 36 sends a BLE server response includes the encrypted AP's security credential to the friendly web endpoint stack 35. At 1514, the friendly web helper stack 36 connects to the AP 400 based on the encrypted AP's security credential.

Figure 16:
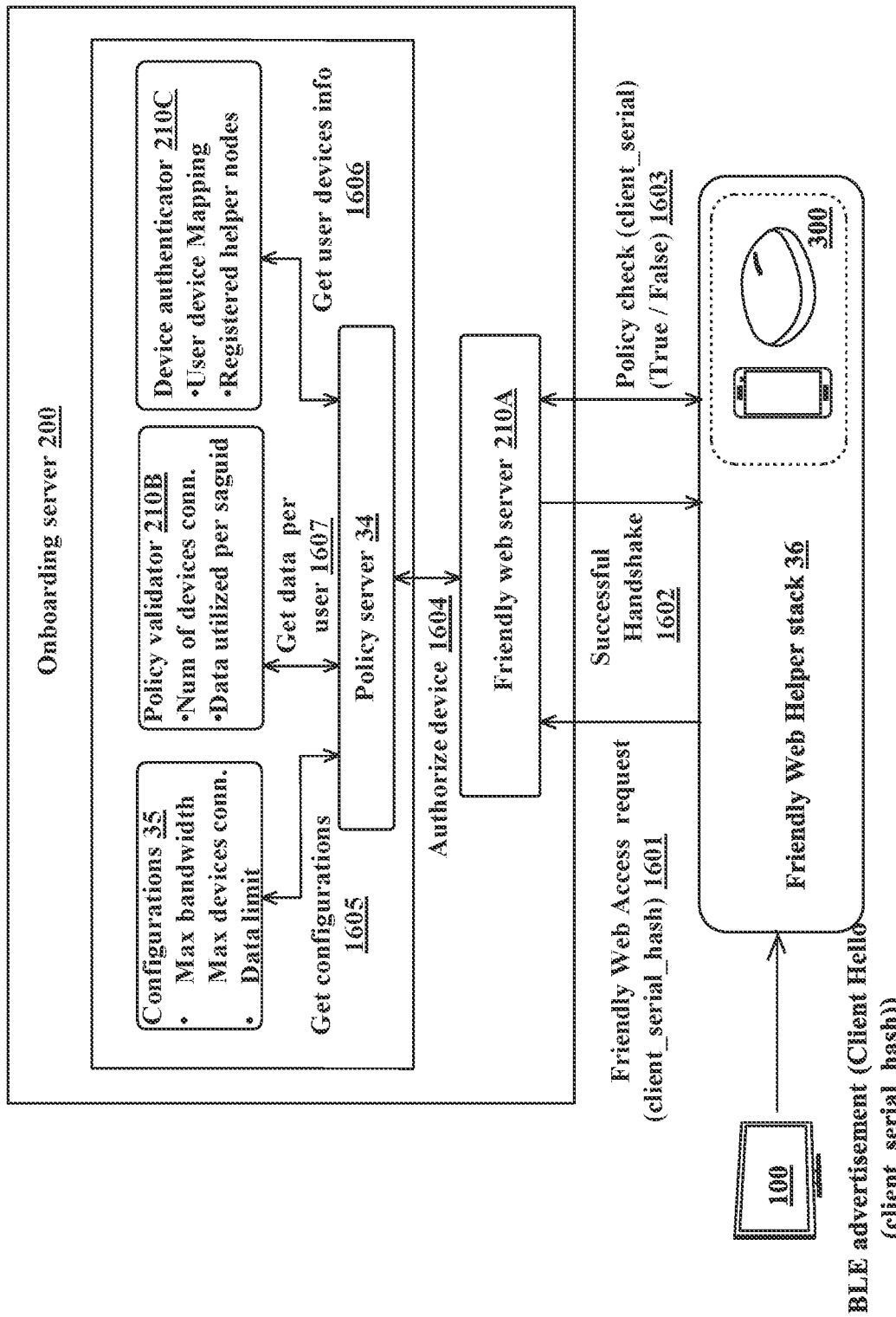
FIG. 16 is a flow diagram illustrating authorization of the onboarding server, according to an embodiment.

FIG. 16 is a flow diagram illustrating authorization of the onboarding server 200, according to an embodiment. In an embodiment, the onboarding server 200 includes the policy server 34, the friendly web server 210A, the policy validator 210B, the device authenticator 210C, and configurations 35, where the configurations 35 defines maximum bandwidth, maximum devices connections, and a data limit. The policy validator 210B contains number of device connections, and data utilized per saguid. The device authenticator 210C performs user device mapping and contains information of registered helper nodes.

At 1601, upon receiving the BLE advertisement (e.g., Client Hello includes client_serial_hash) from the IoT device 100, the friendly web helper stack 36 of the trusted device 300 sends the friendly web access request includes the client_serial_hash to the friendly web server 210A. At 1602, the friendly web server 210A successfully handshakes with the friendly web helper stack 36. At 1603, the friendly web helper stack 36 checks for the policy with the friendly web server 210A by checking whether a client serial number is true or false. At 1604, the friendly web server 210A authorizes the IoT device 100 with the policy server 34 for checking the policy. At 1604, the policy server 34 gets the configurations 35, data per user from the policy validator 210B, and user devices information from the device authenticator 210C for authorizing the IoT device 100.

The embodiments of the disclosure may be implemented using at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

What is claimed is:

1. A self-onboarding method for an Internet of Things (IoT) device, the self-onboarding method comprising:
   identifying, by the IoT device, a trusted device and at least one wireless network in a vicinity of the IoT device, wherein the trusted device is connected to the at least one wireless network and provides a temporary connection to reach an onboarding server;
   based on identifying the trusted device in the vicinity of the IoT device, establishing, by the IoT device, a connection with the onboarding server through the trusted device;
   based on identifying the at least one wireless network in the vicinity of the IoT device, sending, by the IoT device and through the trusted device, a list of the at least one wireless network to the onboarding server using the connection;
   receiving, by the IoT device, self-provisioning information from the onboarding server; and
   onboarding, by the IoT device, through the at least one wireless network based on the self-provisioning information,
   wherein the self-provisioning information comprises a location of the IoT device, a location of the at least one wireless network, and an encrypted security credential of the at least one wireless network.

2. The self-onboarding method of claim 1, wherein the establishing, by the IoT device, the connection with the onboarding server through the trusted device comprises:
   sending, by the IoT device, an advertisement comprising an identifier of the IoT device to the trusted device;
   receiving, by the IoT device, onboarding metadata comprising onboarding server information and authentication information from the trusted device via the temporary connection; and
   establishing, by the IoT device, the connection with the onboarding server through the trusted device based on the onboarding metadata.

3. The self-onboarding method of claim 2, wherein the establishing, by the IoT device, the connection with the onboarding server through the trusted device comprises:
   identifying, by the IoT device, the onboarding server based on the onboarding server information;
   establishing, by the IoT device, the connection with the onboarding server through the trusted device based on the onboarding metadata;
   sending, by the IoT device, the onboarding metadata to the onboarding server; and
   receiving, by the IoT device, a permission to continue the connection with the onboarding server through the trusted device upon successfully authenticating the IoT device by the onboarding server based on the authentication information in the onboarding metadata.

4. The method of claim 3, wherein the establishing, by the IoT device, the connection with the onboarding server through the trusted device comprises:
   sending, by the IoT device, data indicating a public key associated with the IoT device and a token; and
   establishing, by the IoT device, the connection with the onboarding server through the trusted device in response to a successful validation of the token with the public key.

5. The self-onboarding method of claim 1, wherein the onboarding, by the IoT device, through the at least one wireless network comprises:
   disabling, by the IoT device, the connection with the onboarding server;
   determining, by the IoT device, a nearest wireless network from the at least one wireless network based on the location of the IoT device, and the location of the at least one wireless network in the self-provisioning information;
   determining, by the IoT device, a security credential of the nearest wireless network by decrypting the encrypted security credential in the self-provisioning information; and
   onboarding, by the IoT device, through the nearest wireless network by logging in to the nearest wireless network using the security credential.

6. A self-onboarding method for an Internet of Things (IoT) device, the self-onboarding method comprising:
   receiving, by an onboarding server, a request for connection comprising onboarding metadata from the IoT device through a trusted device, wherein the trusted device is connected to at least one wireless network and is connected to the IoT device, and provides a temporary connection to reach the onboarding server;
   determining, by the onboarding server, that the IoT device is authorized based on the onboarding metadata;
   based on determining that the IoT device is authorized, establishing, by the onboarding server, a connection with the IoT device through the trusted device; and
   providing, by the onboarding server, self-provisioning information to the IoT device via the connection,
   wherein the providing, by the onboarding server, the self-provisioning information to the IoT device, comprises:
      receiving, by the onboarding server, a list of at least one wireless network in a vicinity of the IoT device from the IoT device using the connection;
      determining, by the onboarding server, a location of the IoT device based on the list of at least one wireless network;
      determining, by the onboarding server, an encrypted security credential and a location of at least one wireless network included in the list of the at least one wireless network, using a database; and
      sending, by the onboarding server, the self-provisioning information to the IoT device, the self-provisioning information including the location of the IoT device, the location of the at least one wireless network, and the encrypted security credential of the at least one wireless network to the IoT device.

7. The method of claim 6, wherein the determining, by the onboarding server, that the IoT device is authorized comprises:
   receiving, by the onboarding server, a serial number and a token, from the IoT device;
   identifying, by the onboarding server, a public key associated with the IoT device based on the serial number;
   validating, by the onboarding server, the token with the public key; and
   determining, by the onboarding server, that the IoT device is authorized in response to a successful validation of the token with the public key.

8. The self-onboarding method of claim 6, wherein the list of at least one wireless network in the vicinity of the IoT device comprises at least one of an identifier and an access point name for each wireless network included in the list.

9. The self-onboarding method of claim 6, further comprising:
receiving, by the onboarding server, onboarded information from one or more onboarded devices through at least one wireless network in a vicinity of the one or more onboarded devices, wherein the onboarded information from each onboarded device comprises an identifier of at least one wireless network in a vicinity of the onboarded device, a security credential of the at least one wireless network in the vicinity of the onboarded device, and the location of the at least one wireless network in the vicinity of the onboarded device;
encrypting, by the onboarding server, the security credential of the at least one wireless network; and
generating, by the onboarding server, the database based on the identifier of the at least one wireless network, the location of the at least one wireless network, and the encrypted security credential.

10. An Internet of Things (IoT) device comprising:
a memory configured to store instructions; and
a processor configured to execute the instructions to implement a self-onboarding engine;
wherein the self-onboarding engine is configured to:
identify a trusted device and at least one wireless network in vicinity of the IoT device, wherein the trusted device is connected to the at least one wireless network and provides a temporary connection to reach an onboarding server;
based on identifying the trusted device in the vicinity of the IoT device, establish a connection with the onboarding server through the trusted device;
based on identifying the at least one wireless network in the vicinity of the IoT device, send, through the trusted device, a list of the at least one wireless network to the onboarding server using the connection;
receive self-provisioning information from the onboarding server; and
perform onboarding through the at least one wireless network based on the self-provisioning information, and
wherein the self-provisioning information comprises a location of the IoT device, a location of the at least one wireless network, and an encrypted security credential of the at least one wireless network.

11. The IoT device of claim 10, wherein the self-onboarding engine is further configured to establish the connection with the onboarding server by:
sending an advertisement comprising an identifier of the IoT device to the trusted device;
receiving onboarding metadata comprising onboarding server information and authentication information from the trusted device via the temporary connection; and
establishing the connection with the onboarding server through the trusted device based on the onboarding metadata.

12. The IoT device of claim 11, wherein the self-onboarding engine is further configured to establish the connection by:
identifying the onboarding server based on the onboarding server information;
establishing the connection with the onboarding server through the trusted device based on the onboarding metadata;
sending the onboarding metadata to the onboarding server; and
receiving a permission to continue the connection with the onboarding server through the trusted device upon successfully authenticating the IoT device by the onboarding server based on the authentication information in the onboarding metadata.

13. The IoT device of claim 10, wherein the self-onboarding engine is further configured to perform the onboarding through the at least one wireless network by:
disabling the connection with the onboarding server;
determining a nearest wireless network from the at least one wireless network based on the location of the IoT device, and the location of the at least one wireless network in the self-provisioning information;
determining a security credential of the nearest wireless network by decrypting the encrypted security credential in the self-provisioning information; and
onboarding through the nearest wireless network by logging in to the nearest wireless network using the security credential.

14. An onboarding server for self-onboarding an Internet of Things (IoT) device, the onboarding server comprising:
a memory configured to store instructions; and
a processor configured to execute the instructions to implement a self-onboarding engine;
wherein the self-onboarding engine is configured to:
receive a request for connection comprising onboarding metadata from the IoT device through a trusted device, wherein the trusted device is connected to at least one wireless network and is connected to the IoT device, and provides a temporary connection to reach the onboarding server;
determine that the IoT device is authorized based on the onboarding metadata;
based on determining that the IoT device is authorized, establish a connection with the IoT device through the trusted device; and
provide self-provisioning information to the IoT device via the connection, and
wherein the self-onboarding engine is further configured to provide the self-provisioning information to the IoT device by:
receiving a list of the at least one wireless network in a vicinity of the IoT device from the IoT device using the connection;
determining a location of the IoT device based on the list of the at least one wireless network;
determining an encrypted security credential and a location of at least one wireless network included in the list of the at least one wireless network, using a database; and
sending the self-provisioning information to the IoT device, the self-provisioning information including the location of the IoT device, the location of the at least one wireless network, and the encrypted security credential of the at least one wireless network.

15. The onboarding server of claim 14, wherein the list of the at least one wireless network in the vicinity of the IoT device comprises at least one of an identifier and an access point name for each wireless network included in the list.

16. The onboarding server of claim 14, wherein the self-onboarding engine is further configured to:
receive onboarded information from one or more onboarded devices through at least one wireless network in a vicinity of the one or more onboarded devices, wherein the onboarded information from each onboarded device comprises an identifier of at least one wireless network in a vicinity of the onboarded device, a security credential of the at least one wireless network in the vicinity of the onboarded device, and the location of the at least one wireless network in the vicinity of the onboarded device;

encrypt the security credential of the at least one wireless network; and generate the database based on the identifier of the at least one wireless network, the location of the at least one wireless network, and the encrypted security credential.

\* \* \* \* \*